April 24, 1956   M. I. WILLIAMSON ET AL   2,743,009
ARTICLE SUPPORTING AND CONTAINING CARTONS
Filed June 11, 1952   13 Sheets-Sheet 1
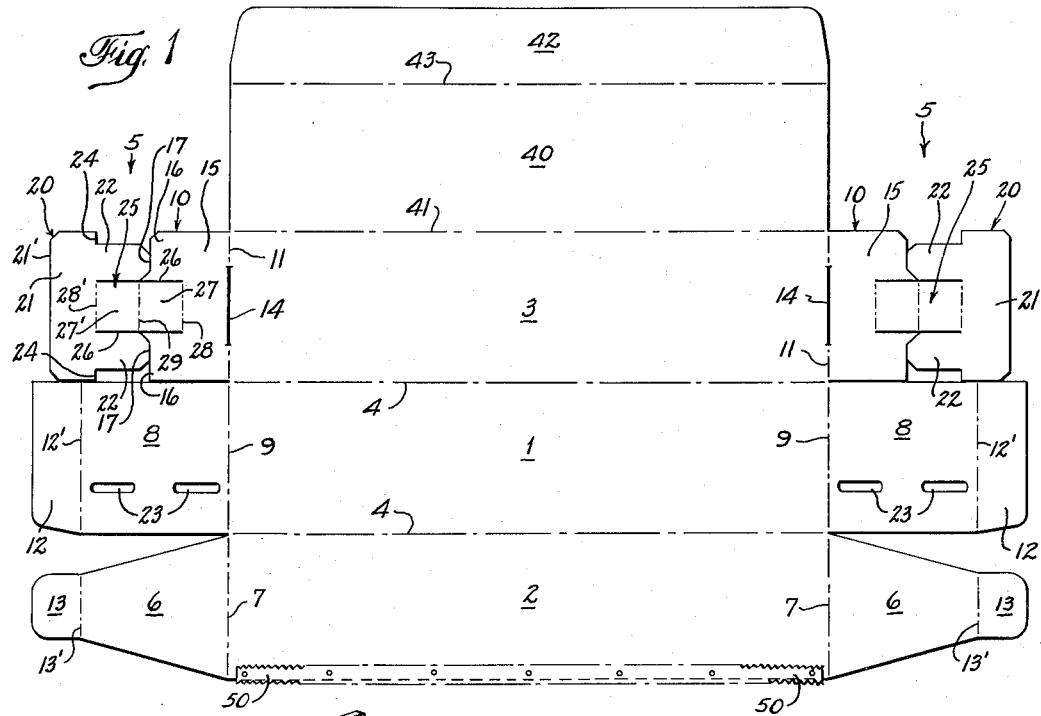
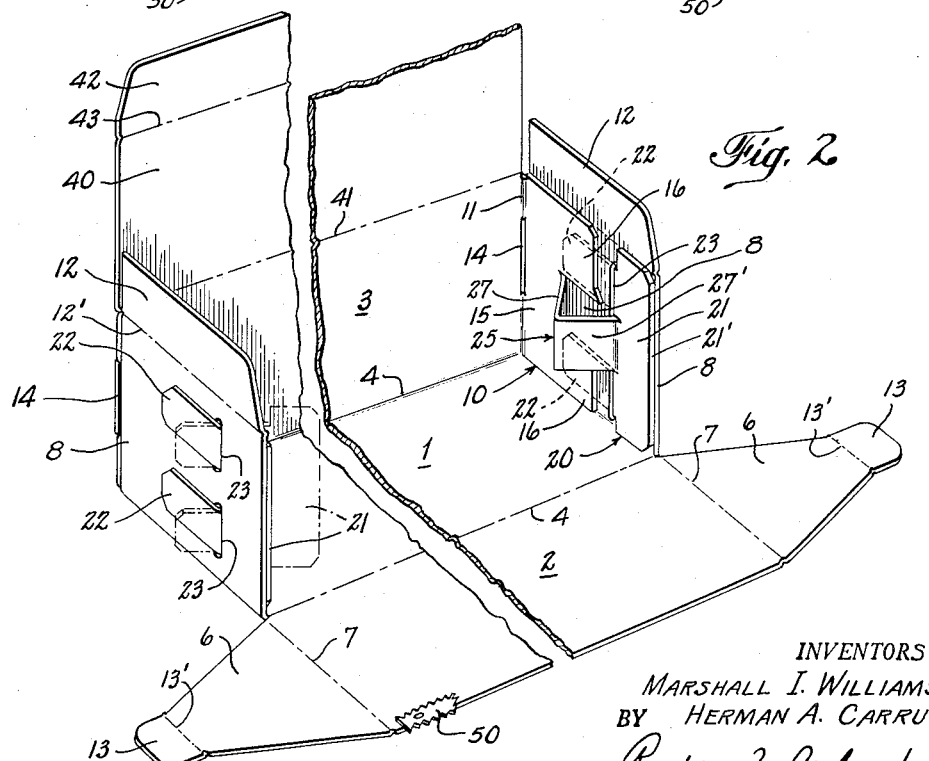
INVENTORS
MARSHALL I. WILLIAMSON
BY  HERMAN A. CARRUTH
ATTORNEY

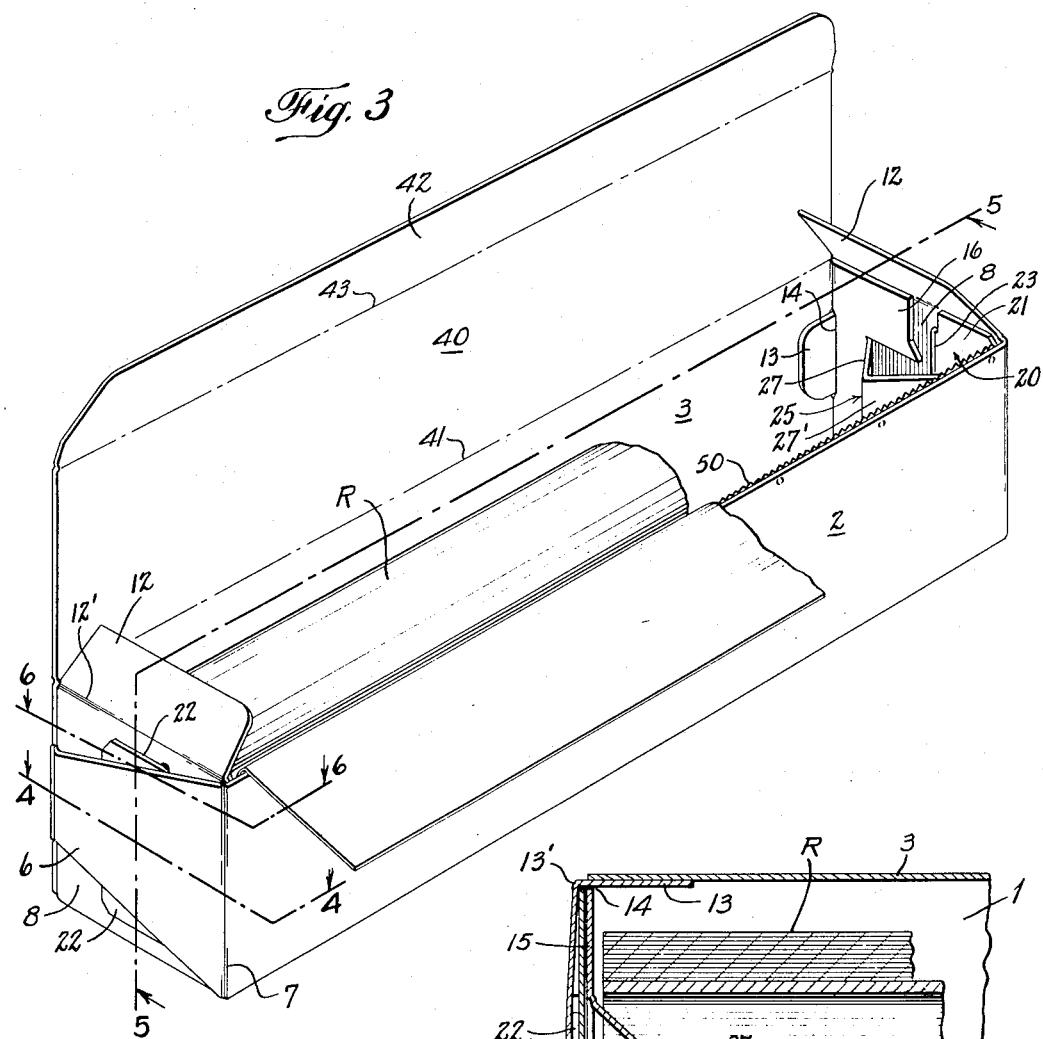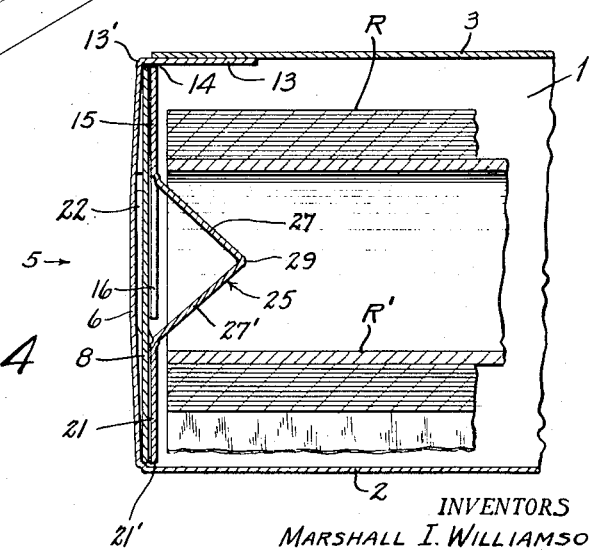

INVENTORS
MARSHALL I. WILLIAMSON
BY HERMAN A. CARRUTH

ATTORNEY

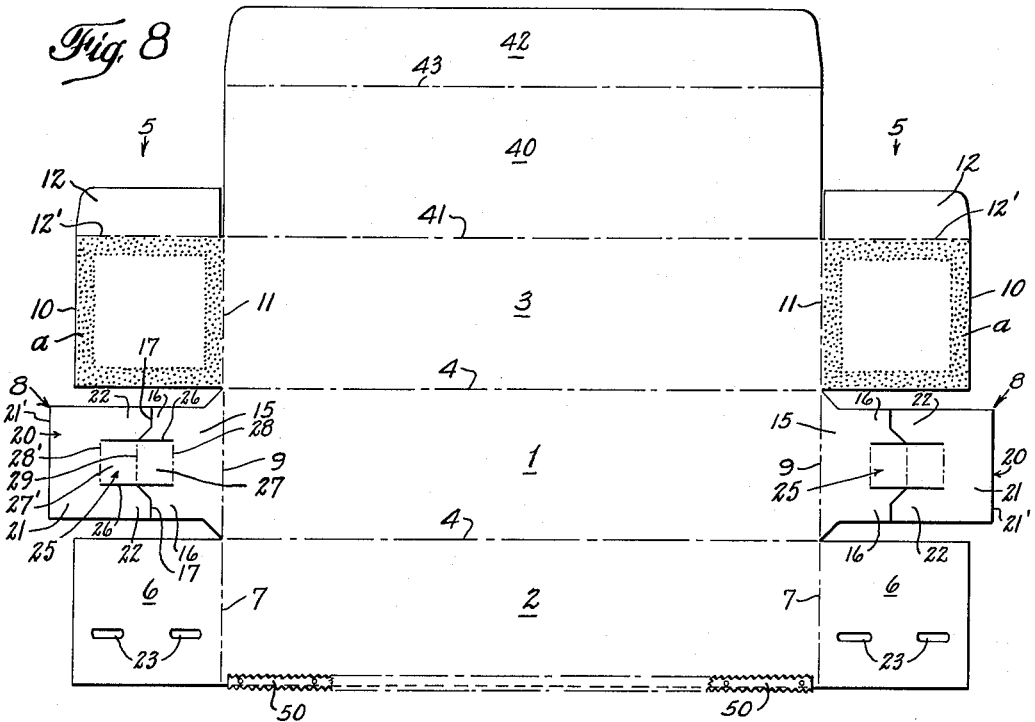
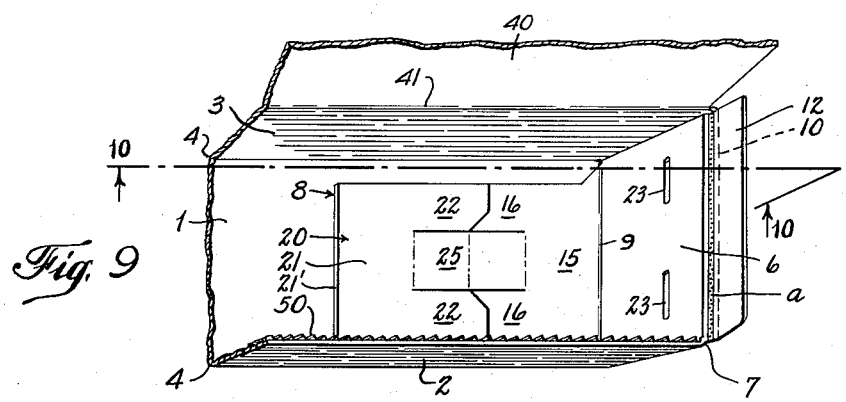
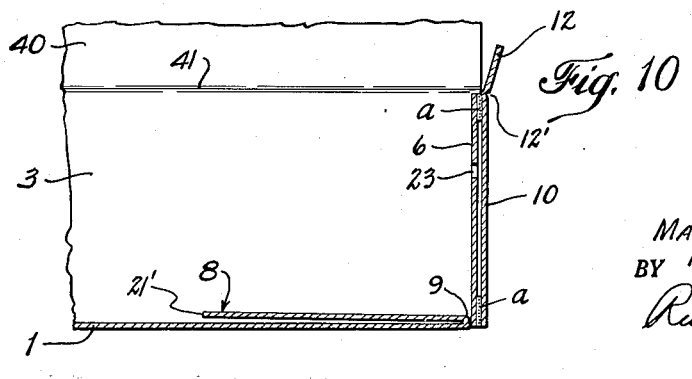
INVENTORS
MARSHALL I. WILLIAMSON
BY HERMAN A. CARRUTH
ATTORNEY.

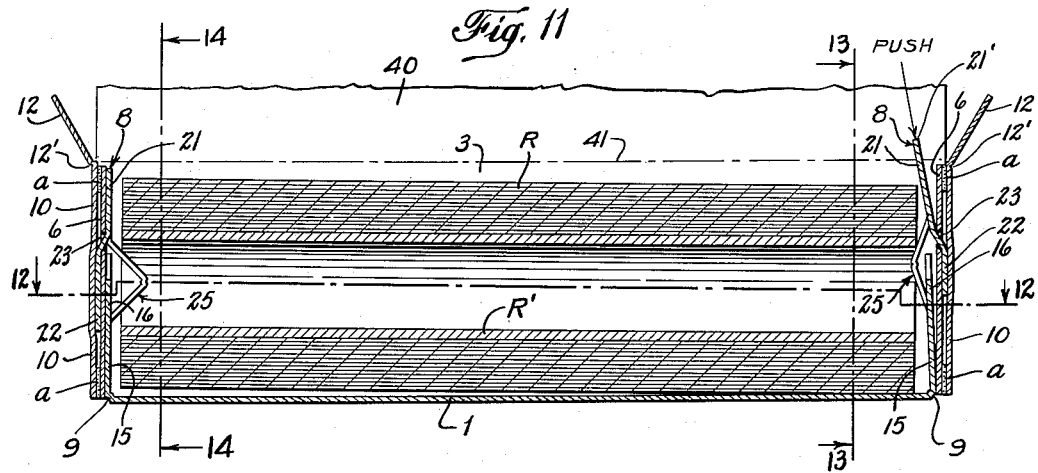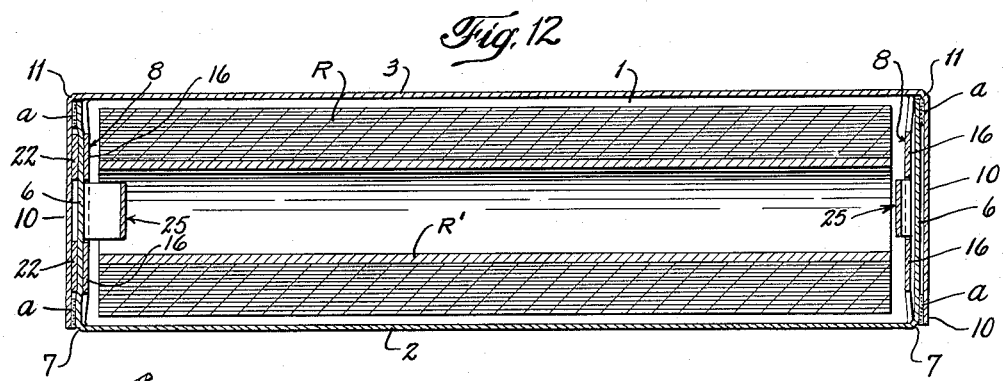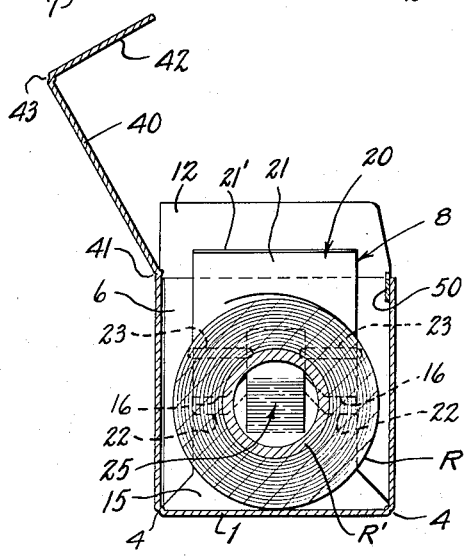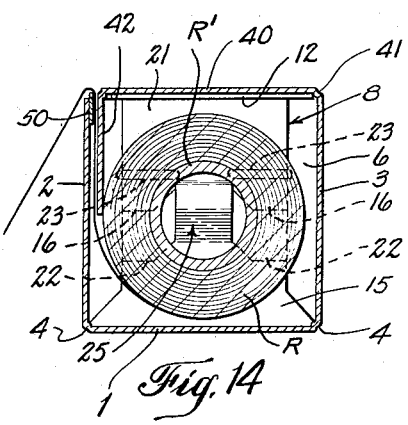

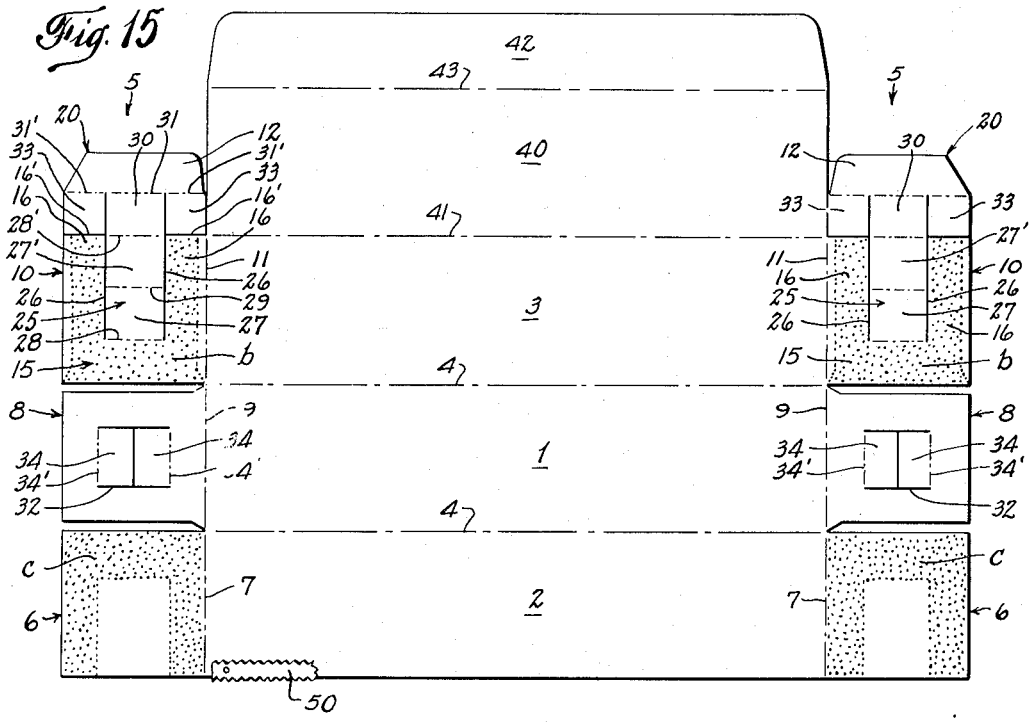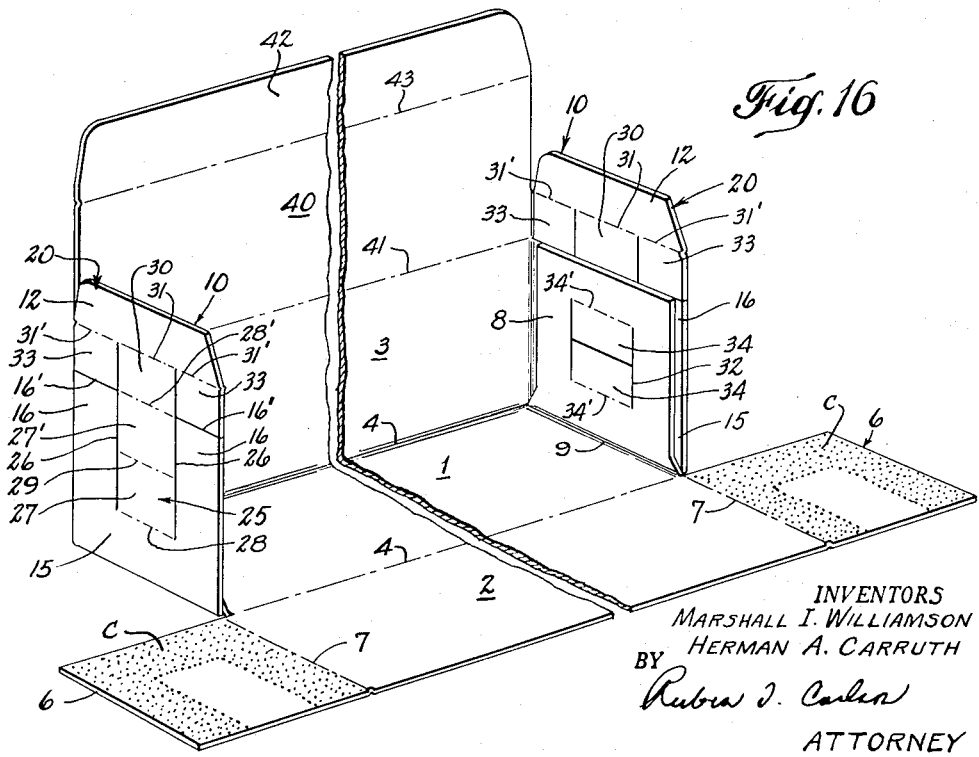

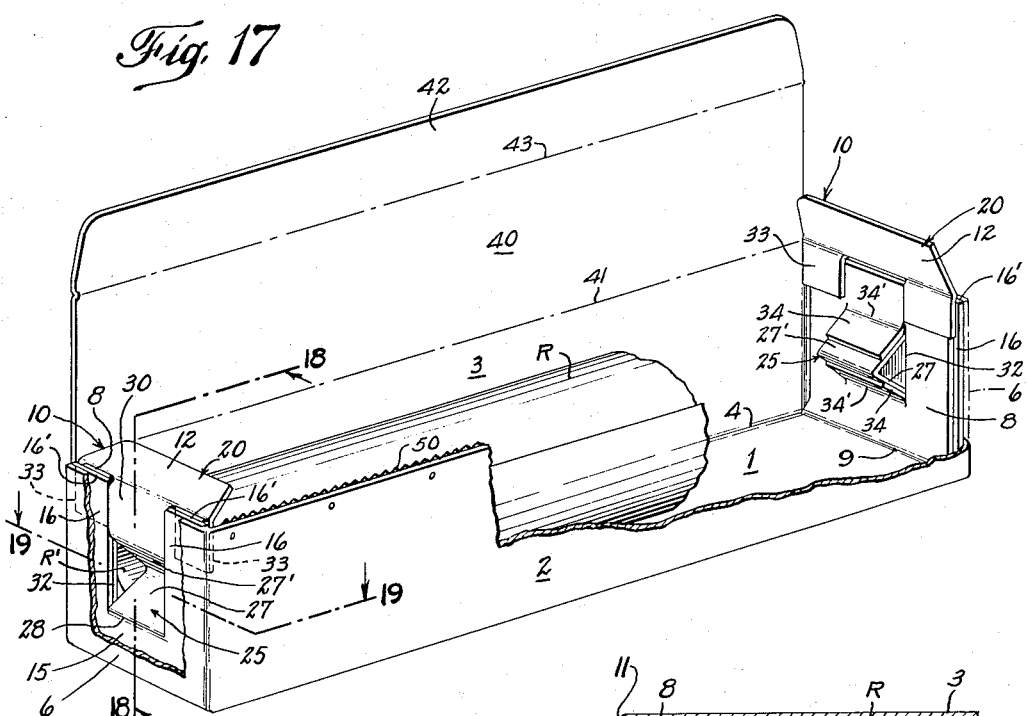

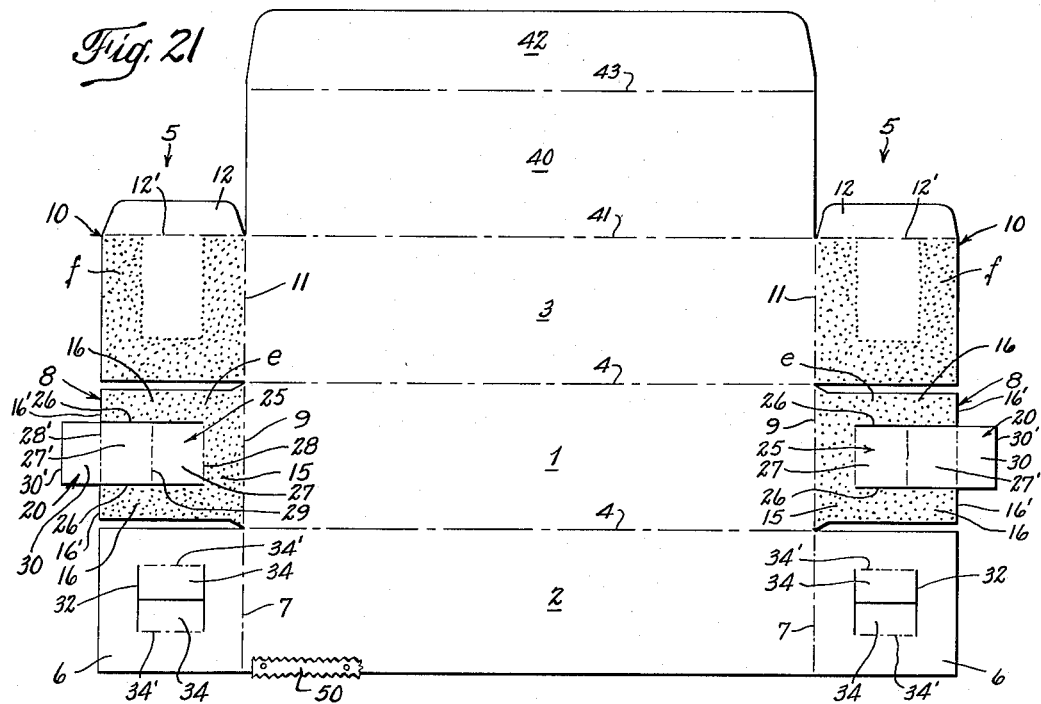
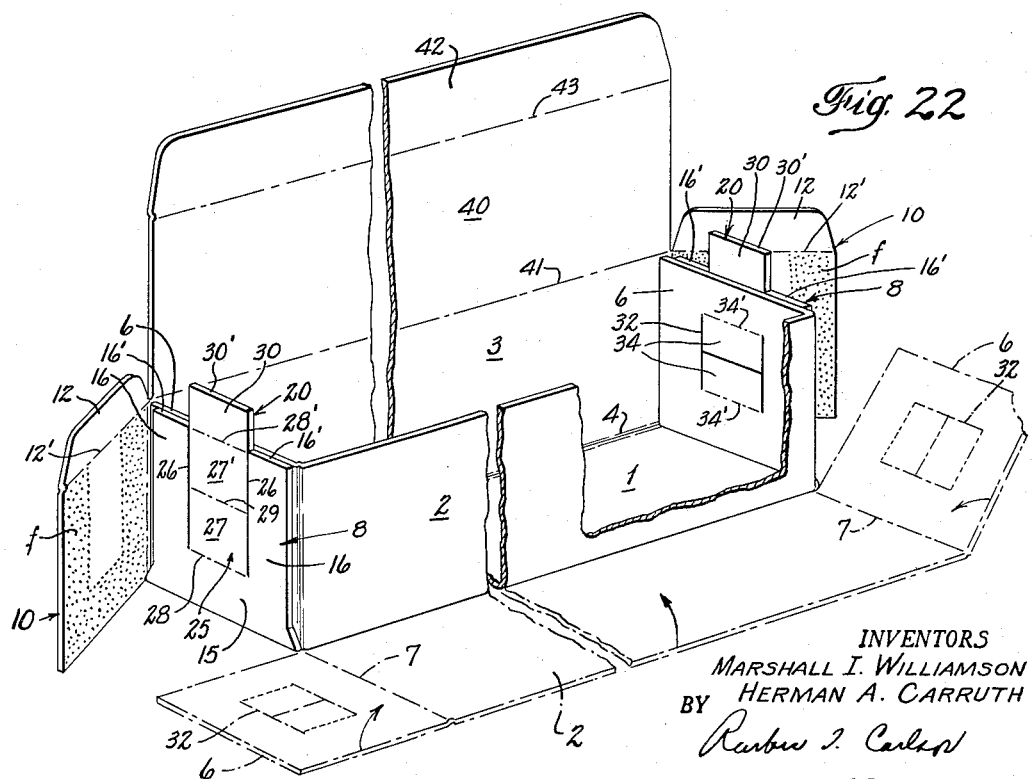

April 24, 1956   M. I. WILLIAMSON ET AL   2,743,009
ARTICLE SUPPORTING AND CONTAINING CARTONS
Filed June 11, 1952   13 Sheets-Sheet 9
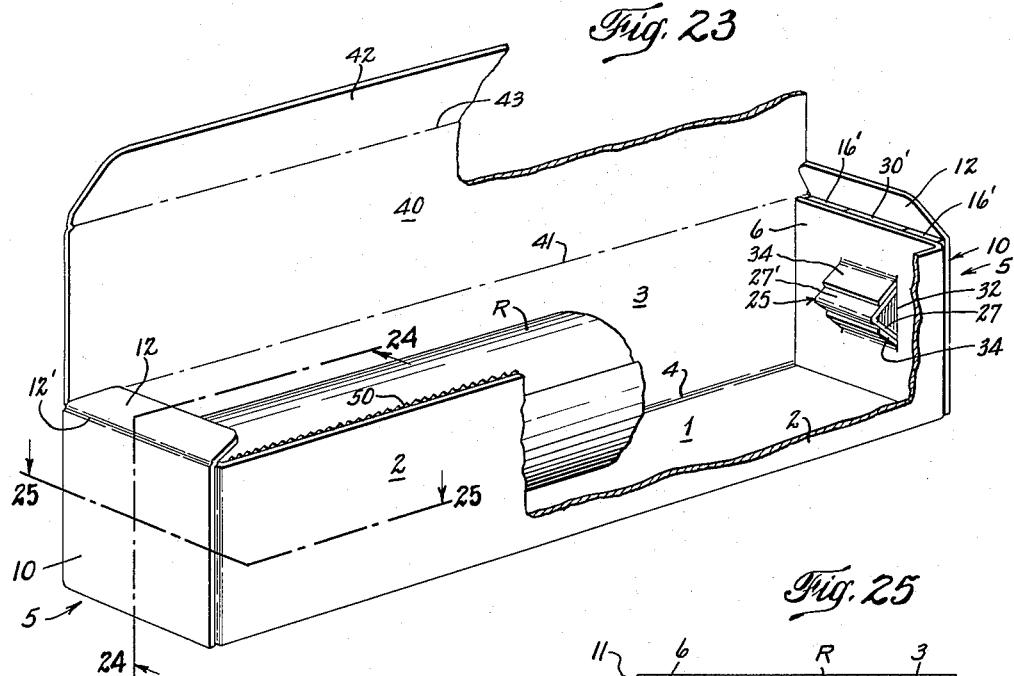
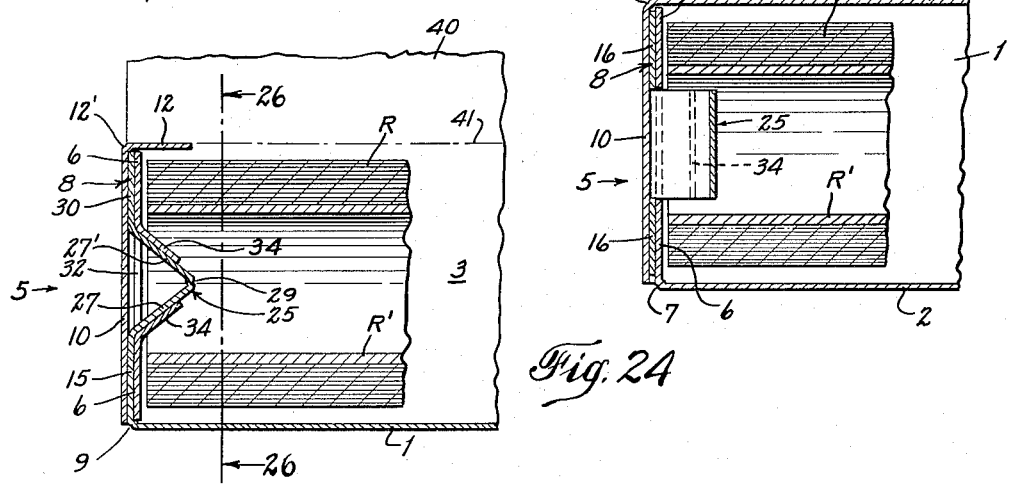
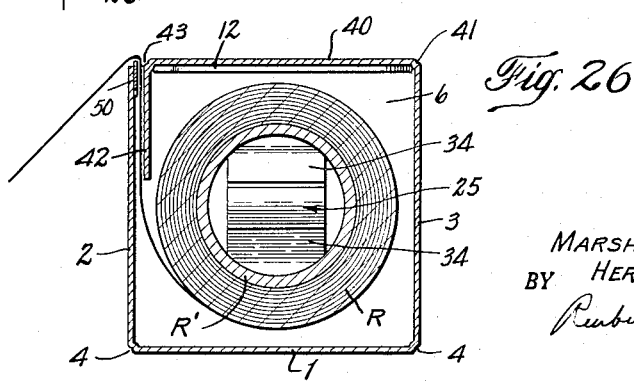
INVENTORS
MARSHALL I. WILLIAMSON
BY HERMAN A. CARRUTH
ATTORNEY.

April 24, 1956   M. I. WILLIAMSON ET AL   2,743,009
ARTICLE SUPPORTING AND CONTAINING CARTONS
Filed June 11, 1952   13 Sheets-Sheet 10
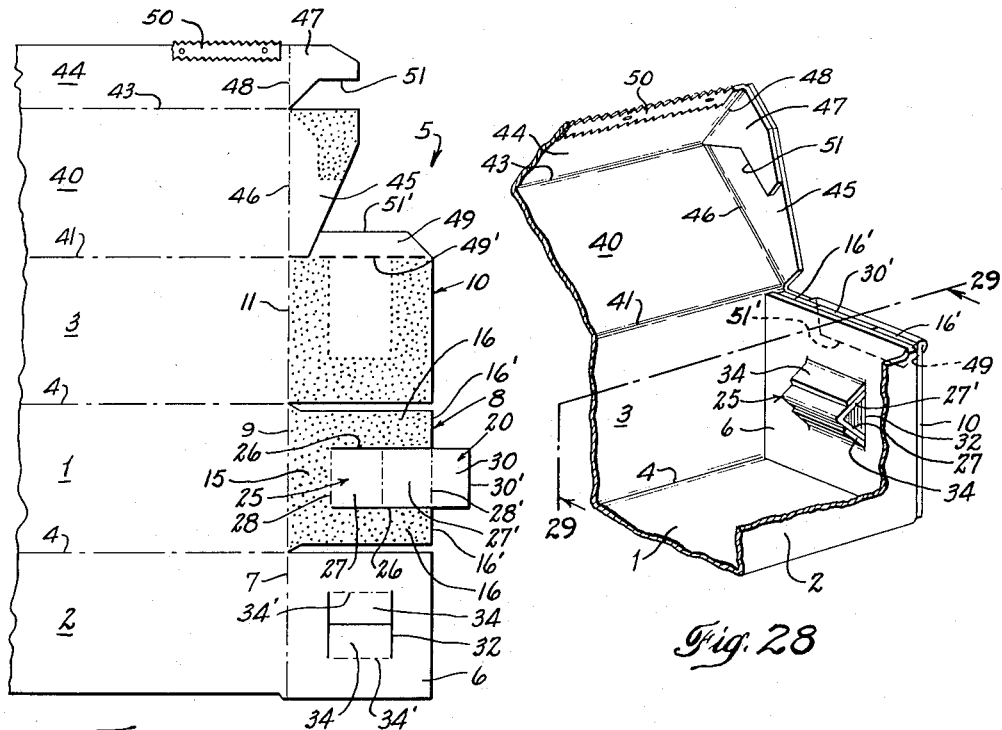
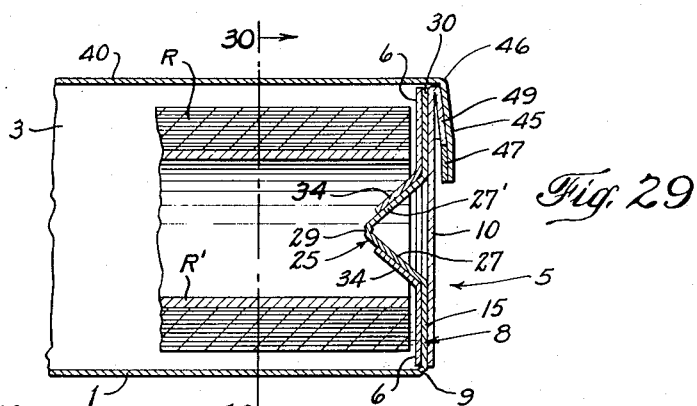
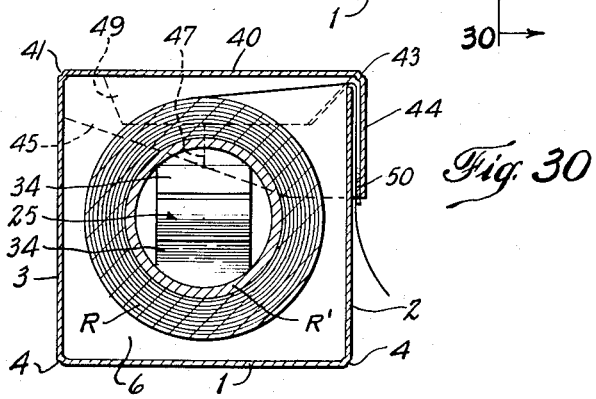
INVENTORS
MARSHALL I. WILLIAMSON
HERMAN A. CARRUTH
BY
ATTORNEY.

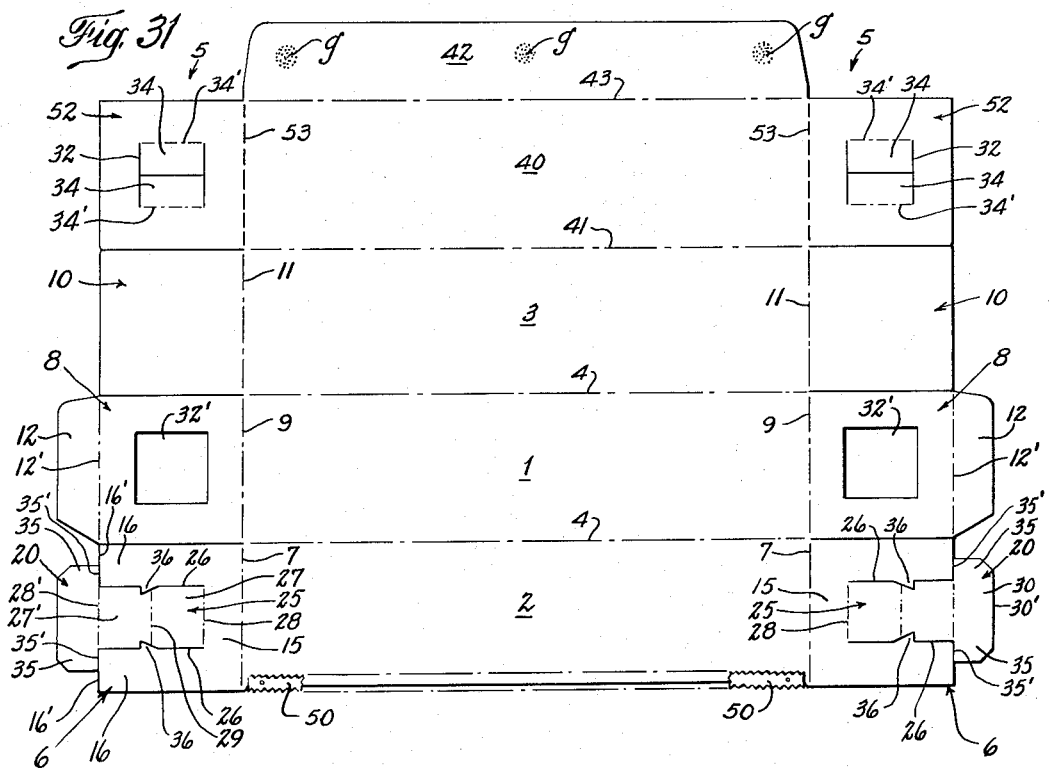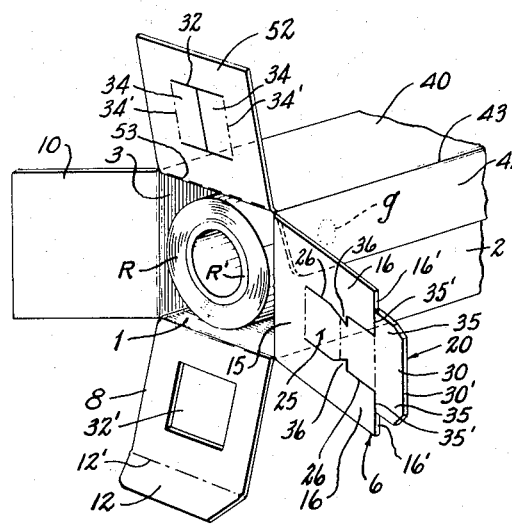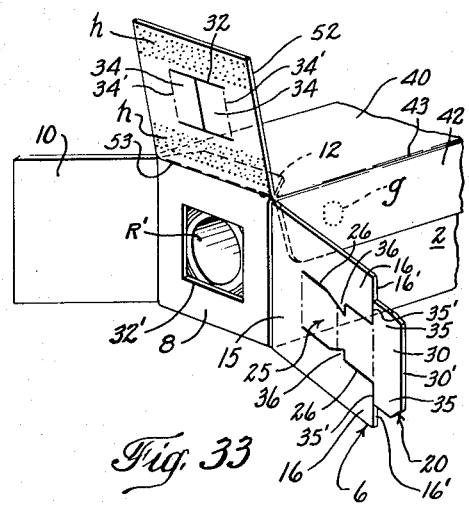

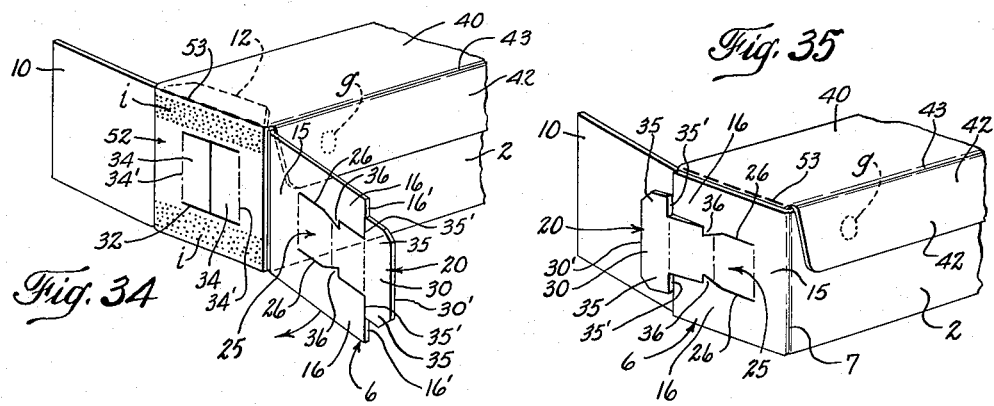
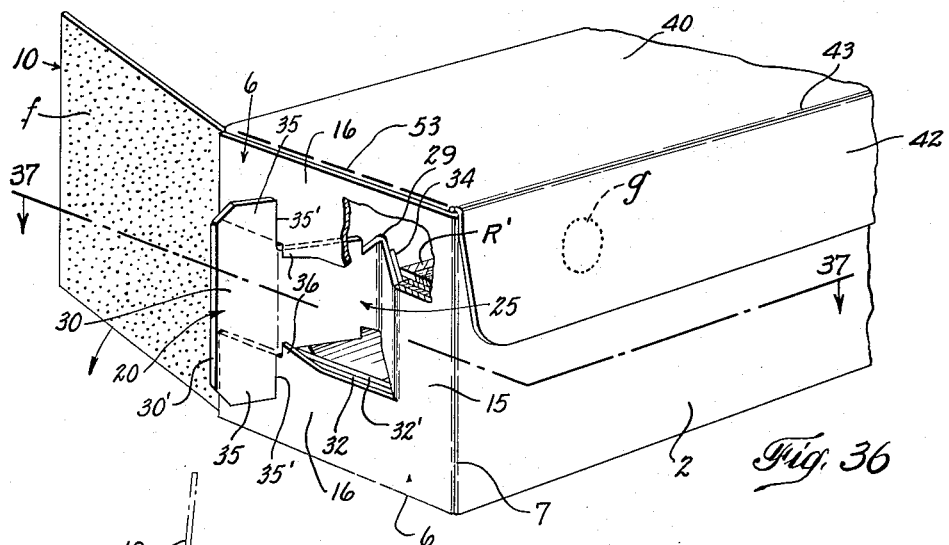
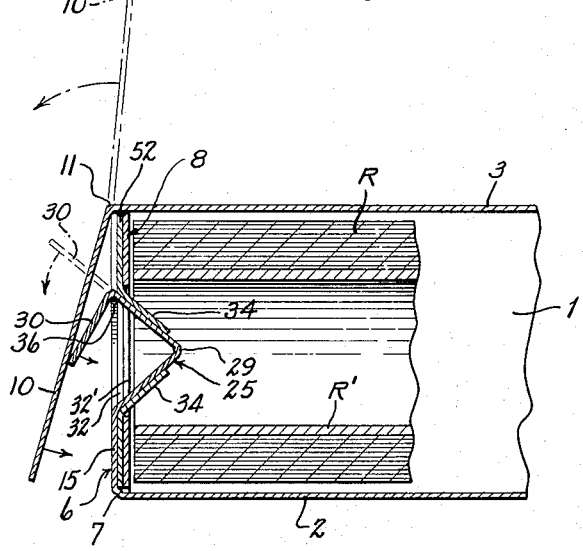

April 24, 1956  M. I. WILLIAMSON ET AL  2,743,009
ARTICLE SUPPORTING AND CONTAINING CARTONS
Filed June 11, 1952  13 Sheets-Sheet 13
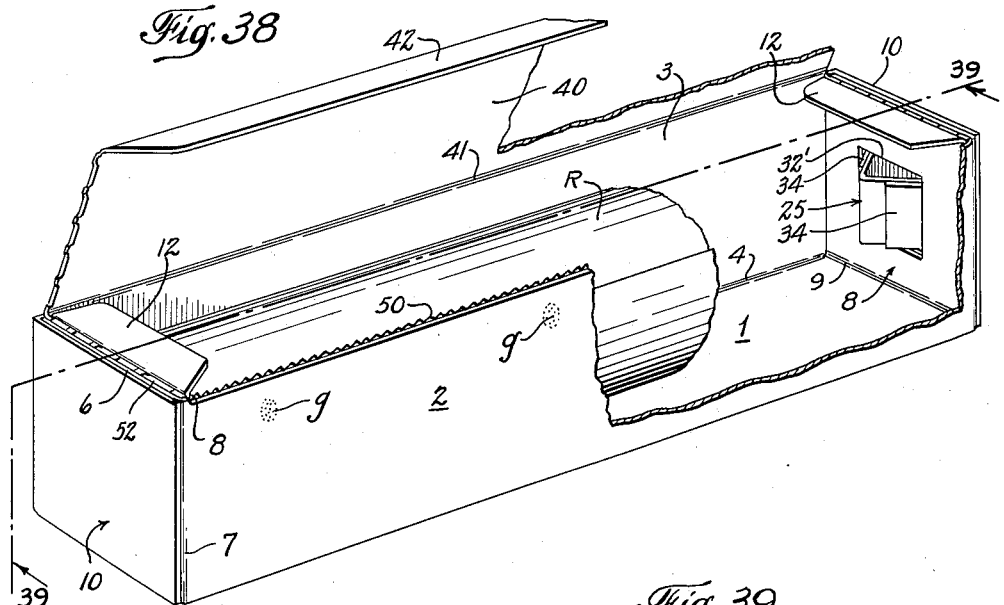
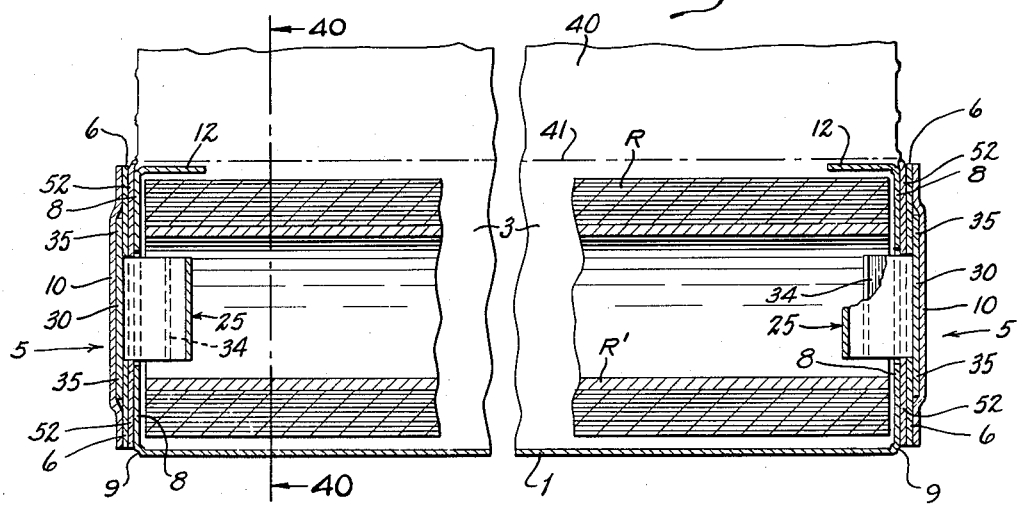
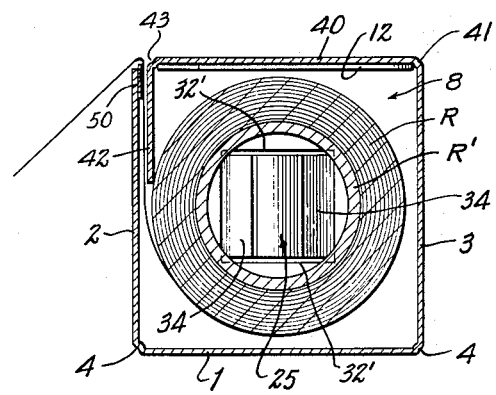
INVENTORS
MARSHALL I. WILLIAMSON
BY HERMAN A. CARRUTH
ATTORNEY.

2,743,009

ARTICLE SUPPORTING AND CONTAINING CARTONS

Marshall I. Williamson, New Haven, and Herman A. Carruth, Northford, Conn., assignors, by mesne assignments, to Federal Paper Board Company, Inc., Bogota, N. J., a corporation of New York Application June 11, 1952, Serial No. 292,884

27 Claims. (Cl. 206—58)

This invention relates to article supporting and containing cartons, and more particularly to improved means forming an integral part of paperboard and fiberboard cartons operative to engage the article packaged therein in a manner to hold, retain, lock and suspend the article within the carton.

Many articles of commerce such as delicate instruments and mechanisms, fragile articles, rolled sheets and the like, can best be protected and retained in the carton or dispensed from the carton where the carton is provided with means projecting inwardly from opposite walls thereof for supporting or suspending the article within the carton so that the article is held in spaced relation to one or more of the article enclosing walls of the carton, or is locked within the carton in a manner to prevent undesired removal of the article from the carton, or is journaled in the carton for rotative movement of the article within the carton. By way of example, in the packaging of rolled wax paper, paper towels, paper napkins, sheet foil, ribbon, tape, strip and like sheet material, it is desirable to provide means projecting inwardly from the end walls of the carton for engaging the adjacent ends of the roll core in a manner to permit free rotation of the sheet roll thereon when sectional lengths of the sheet are withdrawn and severed.

In its general aspects, this invention is directed to the provision of improved means associated with opposite walls of paperboard and fiberboard cartons and forming an integral part thereof, for positively supporting, locking and suspending the article packaged within the carton in spaced relation to one or more of the enclosing walls thereof. Where the article packaged in the carton is relatively delicate or fragile, as in the case of special instruments, mechanisms, glass objects and the like, the improved suspension means of this invention provides cushioned protection for the packaged article so that it will not be damaged as a result of blows delivered to the enclosing walls of the carton. Additionally, the article retaining means of this invention are so shaped and formed as to lock the article within the box part of the carton when the cover part thereof is opened and the box part is inverted. The improved article retaining means of this invention are also particularly effective and useful in rotatably suspending various articles such as sheet rolls within the carton so as to permit convenient withdrawal and severance of sectional lengths thereof.

The improved article retaining means of this invention are shaped and formed as an integral part of the plural-ply end walls of the carton, and are assembled in such a manner as to project inwardly from the end walls at the approximate longitudinal center of the box part to thereby engage the ends of the article packaged therein. In accordance with this invention, the article retaining means may be made to permit article engaging manipulation thereof during shaping and forming of the enclosing walls of the carton around the article, or alternatively, the article retaining means may be so made as to permit article engaging manipulation thereof after the carton has been fully assembled and the article inserted into the carton. In addition, the article retaining means may be so made as to permit manual manipulation thereof after packaging so that the article packaged can be intentionally withdrawn from the assembled carton, or alternatively, may be so made as to permanently lock and seal the packaged article in the carton so that the article can only be removed by destroying the carton.

The blanks from which these improved cartons are formed are so cut and shaped as to incorporate the article retaining means an an integral part thereof, and if desired, to additionally provide supplemental reinforcing to stiffen and strengthen the article retaining means so that they are relatively unyielding. These blanks are also so formed as to require finishing and printing on one side thereof only, and are designed for speedy and convenient machine or hand assembly at relatively low cost, and with minimum waste of paperboard or fiberboard material.

Other objects and advantages of this invention will become apparent as the disclosure proceeds.

There is shown in the accompanying drawings a series of cartons incorporating various forms of article retaining means as illustrative of this invention, the cartons shown being particularly shaped and designed for the packaging of rolled sheet material, and wherein the sheet rolls are rotatably suspended within the box parts of these illustrative cartons. Referring to the drawings:

Fig. 1 is a plan view of the inside face of a prepared blank from which a hand assembled carton may be erected which incorporates the improved article suspending means of this invention;

Fig. 2 is a perspective view of the blank shown in Fig. 1 in progress of assembly into the erected carton;

Fig. 3 is a perspective view of the fully assembled carton showing a sheet roll therein, one end of the sheet roll being broken away to reveal the position of the article suspending means after adjustment to extend into the end of the roll core and thereby suspend and journal the sheet roll;

Fig. 4 is a fragmentary horizontal cross section taken along line 4—4 of Fig. 3 showing further details of the article suspending means;

Fig. 8 is a plan view of the inside face of a modified form of prepared blank which incorporates the improved article retaining means of this invention and which is particularly designed for machine erection into carton form;

Fig. 9 is a fragmentary perspective view of the assembled carton formed from the blank shown in Fig. 8 as it would appear when looking towards the bottom wall thereof, this view showing the article suspending flap folded downwardly after machine assembly of the carton to reveal structural details;

Fig. 10 is a fragmentary vertical cross section taken longitudinally of the assembled carton as viewed along line 10—10 of Fig. 9;

Fig. 11 is a vertical cross section taken longitudinally of the carton assembled from the blank shown in Fig. 8, this view showing the article suspending flap at the left hand end of the carton fully manipulated to project its buckling portions into a roll core, the suspending flap at the right hand end of the carton being shown in process of manipulation into article suspending position;

Fig. 12 is a horizontal cross section of the article filled carton as viewed along line 12—12 of Fig. 11;

Fig. 13 is a transverse cross section of the article filled carton as viewed along line 13—13 of Fig. 11;

Fig. 14 is another transverse cross section of the article filled carton as viewed along line 14—14 of Fig. 11;

Fig. 15 is a plan view of the inside face of a further modified form of prepared blank adapted for machine assembly into a carton which incorporates the article suspending and journaling means of this invention;

Fig. 16 is a perspective view of the blank as shown in Fig. 1 partly assembled into the erected carton;

Fig. 17 is a perspective view of the fully assembled carton showing a sheet roll therein and with the buckling portions of the roll suspending flaps in roll supporting position, certain parts of the carton and sheet roll being broken away to reveal further structural details of the carton;

Fig. 18 is a vertical cross section taken longitudinally of the article filled carton as viewed along line 18—18 of Fig. 17, this view showing further details of the article suspending flaps and the associated buckling portions thereof;

Fig. 19 is a fragmentary horizontal cross section taken along line 19—19 of Fig. 17 showing further details of the article suspending flap and its associated article engaging buckling portions;

Fig. 20 is a transverse cross section of the article filled carton with the cover part in closed position as the same would appear when viewed along line 20—20 of Fig. 18;

Fig. 21 is a plan view of the inside face of a prepared blank of further modified form from which a carton embracing the article suspending means of this invention may be formed;

Fig. 22 is a perspective view of the blank shown in Fig. 21 partly assembled into the erected carton;

Fig. 23 is a perspective view of the fully assembled carton of Fig. 22 with a rolled sheet therein, certain parts being broken away to reveal further details of the article suspending flaps and the article engaging buckling portions thereof;

Fig. 24 is a vertical cross section taken longitudinally of the article filled carton as viewed along line 24—24 of Fig. 23, this view showing further details of the article suspending flaps associated with this carton;

Fig. 25 is a fragmentary horizontal cross section taken along line 25—25 of Fig. 23 showing further details of the article engaging buckling portions associated with this carton;

Fig. 26 is a transverse cross section of the article filled carton as viewed along line 26—26 of Fig. 24;

Fig. 27 is a fragmentary plan view of a prepared blank having a box forming part similar to that shown in Fig. 21, the blank shown in Fig. 27 also forming a telescoping cover part presenting cover end flanges having abutment elements associated therewith designed to releasably interlock with abutment flaps associated with the end walls of the box part;

Fig. 28 is a fragmentary perspective view of the fully assembled carton formed from the blank shown in Fig. 27, certain parts of the carton being broken away to reveal structural details;

Fig. 29 is a fragmentary vertical cross section taken longitudinally of the article filled carton as viewed along line 29—29 of Fig. 28 and as the same would appear when the cover part is releasably locked in closed position;

Fig. 30 is a transverse cross section of the article filled carton as viewed along line 30—30 of Fig. 29;

Fig. 31 is a plan view of the inside face of a prepared blank of a further modified form incorporating means for locking the article within the carton as assembled, the blank here shown being designed for article packaging and machine assembly with the end walls thereof closed and sealed on an end sealing machine;

Fig. 32 is a fragmentary perspective view of the blank shown in Fig. 31 after the article such as a sheet roll has been positioned within the body thereof and as the same would appear prior to folding assembly of the end wall forming flaps thereof;

Fig. 33 is a fragmentary perspective view of the partly assembled carton as it would appear when the first end wall forming flap has been folded to end closing position;

Fig. 34 is a fragmentary perspective view of the partially assembled carton as it would appear after the second end wall forming flap has been folded and sealed into end closing position;

Fig. 35 is a fragmentary perspective view of the partially assembled carton as it would appear after the third end wall forming flap which incorporates the roll locking means, has been folded into end closing position;

Fig. 36 is a fragmentary perspective view of the carton assembled to the stage shown in Fig. 35 and as it would appear after the roll locking means associated with the third end wall forming flap has been manipulated to engage the adjacent end of the packaged article;

Fig. 37 is a fragmentary horizontal cross section showing the fourth end wall flap in progress of folding into end sealing position following the operation shown in Fig. 36;

Figure 5:
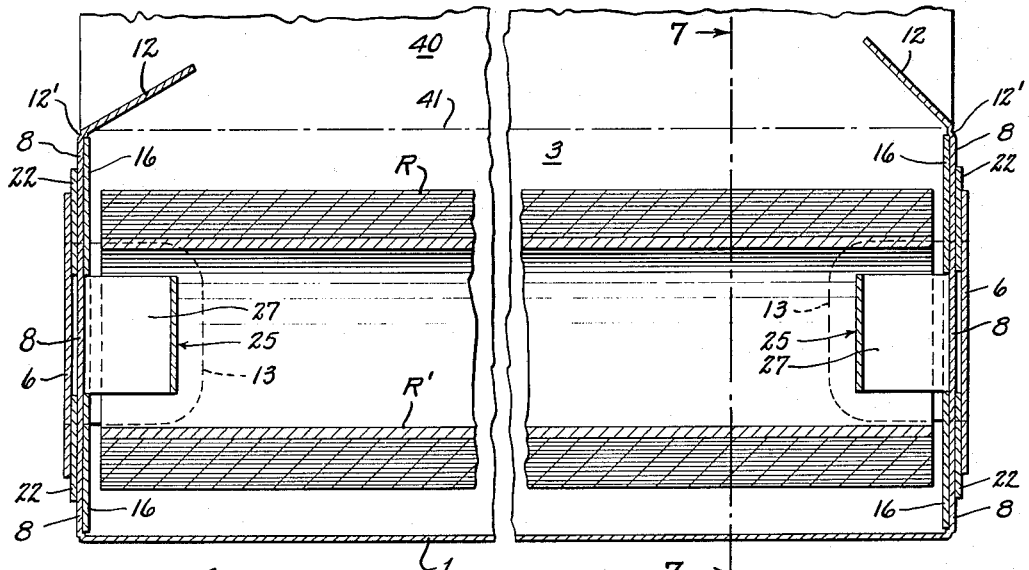
Fig. 5 is a vertical cross section taken longitudinally of the carton as viewed along line 5—5 of Fig. 3, this view showing further details of the article suspending means adjusted to project into a roll core and thus suspend and journal the sheet roll thereon.
Figure 7:
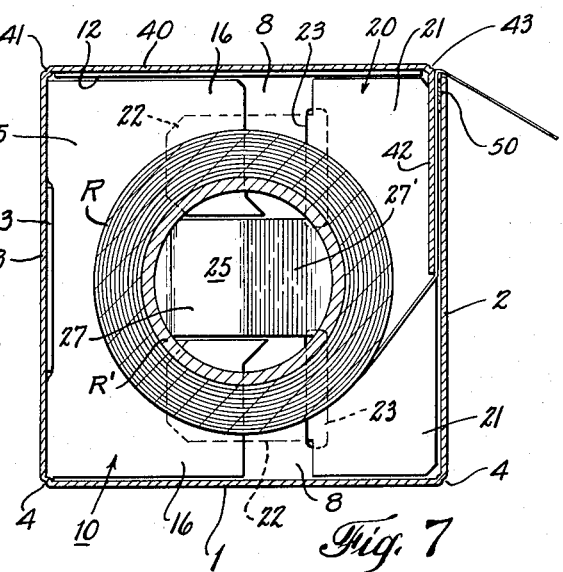
Fig. 7 is a transverse cross section of the filled carton as viewed along line 7—7 of Fig. 5.

Fig. 38 is a perspective view of the fully assembled and article packaged carton formed from the blank shown in Fig. 1 as it would appear when the assembly steps shown in Figs. 31 and 37 have been performed thereon, this view also showing the manner in which the cover part may be broken open to reveal the contents, certain parts of the carton and the article contained therein being broken away to reveal certain details of the article locking means thereof;

Fig. 39 is a vertical cross section taken longitudinally of the carton as the same would appear when viewed along line 39—39 of Fig. 38; and Fig. 40 is a transverse cross section of the article filled carton taken along line 40—40 of Fig. 39 and as it would appear when the cover part has been reclosed.

Similar reference characters refer to similar parts throughout the several views of the drawings and specification.

Article retaining cartons made in accordance with this invention are designed to be economically fabricated from paperboard or fiberboard stock sheets which may be finished and imprinted on one side thereof only and then cut and scored to provide the prepared carton forming blanks in a single pass through a cutting and scoring machine.

All of the paperboard blanks of this invention as shown in Figs. 1, 8, 15, 21, 27 and 31 may be cut and scored to provide a box forming part and a cover forming part. The box forming part of the blank generally comprises a front wall panel 2 and a rear wall panel 3 joined to a bottom wall panel 1 along parallel extending scores 4. The end walls 5 of the carton should be relatively stiff and rigid and preferably of plural-ply thickness. Each of the end walls 5 of the cartons of this invention is of substantially three-ply thickness, and are formed by a front wall flap 6 connected to each end of the front wall panel 2 along a transverse score 7, a bottom end wall flap 8 connected to each end of the bottom wall panel 1 along a transverse score 9, and a rear end wall flap 10 connected to each end of the rear wall panel 3 along a transverse score 11. When the carton is assembled, the adjacent end wall flaps 6, 8 and 10 are arranged in overlapped relationship, with one of these end wall flaps at each end of the carton specially formed to provide the article suspending flap of this invention.

Each of the blanks shown in Figs. 1, 8, 15, 21, 27 and 31 is preferably shaped to provide a hinged cover forming part comprising a top wall panel 40 hingedly connected to the upper edge of the rear wall panel 3 along a longitudinally extending score 41. Each top wall panel 40 may be provided with a tuck-in flap 42 connected to the front edge thereof by a longitudinal score 43 as indicated in Figs. 1, 8, 15, 21 and 31. In the blank shown in Fig. 27, the top wall panel 40 is provided with a front flange section 44 connected thereto along the longitudinal score 43, and end flange sections 45 connected to the ends of the top wall panel 40 along the transverse scores 46. The front flange section 44 and the end flange sections 45 are connected together to provide a telescoping cover by the provision of a securing tab 47 connected by a transverse score 48 to each end of the front flange section 44 and shaped to be adhesively secured to the inside face of the adjacent end flange section 45.

The box part may be designed to contain an article of almost any desired diameter and length. The bottom panel 1, front panel 2 and rear panel 3 of the box part should have a length sufficient to permit the article to be appropriately contained in the box part of the carton between the end walls 5 thereof. The top wall panel 40 of the hinged cover part in all of the cartons of this invention may either have a tuck-in flap 42 associated therewith as indicated in the cartons shown in Figs. 3 and 7, Figs. 13 and 14, Figs. 17 and 20, Figs. 22 and 26, and Figs. 38 and 40, or alternatively, as indicated in Figs. 28 and 30, the top wall panel 40 may incorporate front and end flange sections 44 and 45 which telescope over the front panel 2 and end walls 5 of the box part. Where the carton is to contain a sheet roll, a sheet cutting element 50, by means of which sectional lengths of the sheet roll may be severed, may be associated with either of the upper edge of the front wall panel 2, as indicated in the cartons shown in Figs. 3, 9, 17, 23 and 38, or the sheet cutting edge 50 may be associated with the free edge of the cover front flange section 44 where the carton incorporates a telescoping cover part as indicated in Figs. 28 and 30.

In the carbon forming blank shown in Fig. 1, each bottom end wall flap 8 is sized to substantially conform to the size of the end wall and forms the intermediate ply of the end wall, and may be provided with a dust flap 12 defined by the folding score 12'. Each front end wall flap 6 is designed to form the outer ply of the end wall and is provided with an insert tab 13 connected thereto by a folding score 13' and designed to be frictionally inserted into a slit 14 formed in the transverse score 11 which defines the adjacent end of the rear wall panel 3.

Each rear end wall flap 10 of the blank shown in Fig. 1 is especially formed to provide the article suspending flap of this invention. Each rear end wall flap 10 comprises a fixed base section 15 foldably connected to the rear wall panel 3 along the transverse score 11, and a head section 20 integrally connected to the fixed base section 15 by a buckling section 25. Each buckling section 25 is defined by a pair of longitudinally extending parallel cut lines 26 and is hingedly connected to the fixed base section 15 of the flap 10 by a transverse score 28 and is hingedly connected to the head section 20 of the flap along a transverse score 28'. A transverse medial score 29 divides each buckling section 25 into a pair of hingedly connected strut sections 27 and 27'.

The parallel extending cuts 26 which define the top and bottom ends of the buckling section 25 in the blank of Fig. 1, also define spaced leg extensions 16 associated with the fixed base section 15 of the roll suspending flap 10. The head section 20 of each roll suspending flap is provided with a finger grip extension 21 which may be of the same width as the base section 15 of the flap. The parallel cuts 26 which define the buckling section 25 also define a pair of spaced tongue portions 22 which extend inwardly from the finger grip extension 21 of the head section 20; the tongue portions 22 being separated from the leg portions 16 of the fixed base section 15 by spaced transverse cuts 17. Each pair of spaced tongue portions 22 is designed to be inserted into spaced slots 23 formed in the adjacent bottom end wall flap 8. The finger grip extension 21 of each head section 20 may also be provided with spaced shoulders 24 designed to engage the adjacent ends of the slots 23 in the bottom end wall flap 8 to thereby limit the movement of the head section 20 when the carton is assembled.

In assembling the carton from the blank shown in Fig. 1, the rear wall panel 3 is first erected and the article suspending flaps 10 are folded forwardly to extend over the ends of the bottom wall panel 1 as shown in Fig. 2. The bottom end wall flaps 8 are then erected to overlie the outside face of the adjacent roll suspending flaps 10. The finger grip extensions 21 of the head sections 20 will then extend forwardly of the front vertical edges of the erected bottom end wall flaps 8. Each finger grip extension may then be manipulated to insert the tongue portions 22 thereof through the slots 23 in the erected bottom end wall flap 8 so that the tongue portions 22 will overlie the outside face of the adjacent end wall flap 8 as shown in Fig. 2.

Prior to the insertion of the tongue portions 22 into the respective receiving slots 23 in the bottom end wall flaps 8, and while each buckling section 25 lies in substantially the same plane as the base section 15 of the roll suspending flaps, the article such as a sheet roll R is placed within the carton when formed substantially as shown in Fig. 2. Thereupon, the finger grip extensions 21 of the article suspending flaps are manipulated to insert the tongue portions 22 into the slots 23. This insertion operation will automatically cause the buckling sections 25 to buckle inwardly so that the strut portions 27 and 27' thereof are projected inwardly to engage the adjacent ends of the article, or if a sheet roll is packaged, to project into the ends of the roll core R'.

When the article has been thus suspended within the partly assembled carton, the front wall panel 2 may be raised, the front end wall flaps 6 swung rearwardly and the tab portions 13 thereof inserted into the adjacent slits 14 so as to overlie the inside face of the rear wall panel 3.

Figure 6:
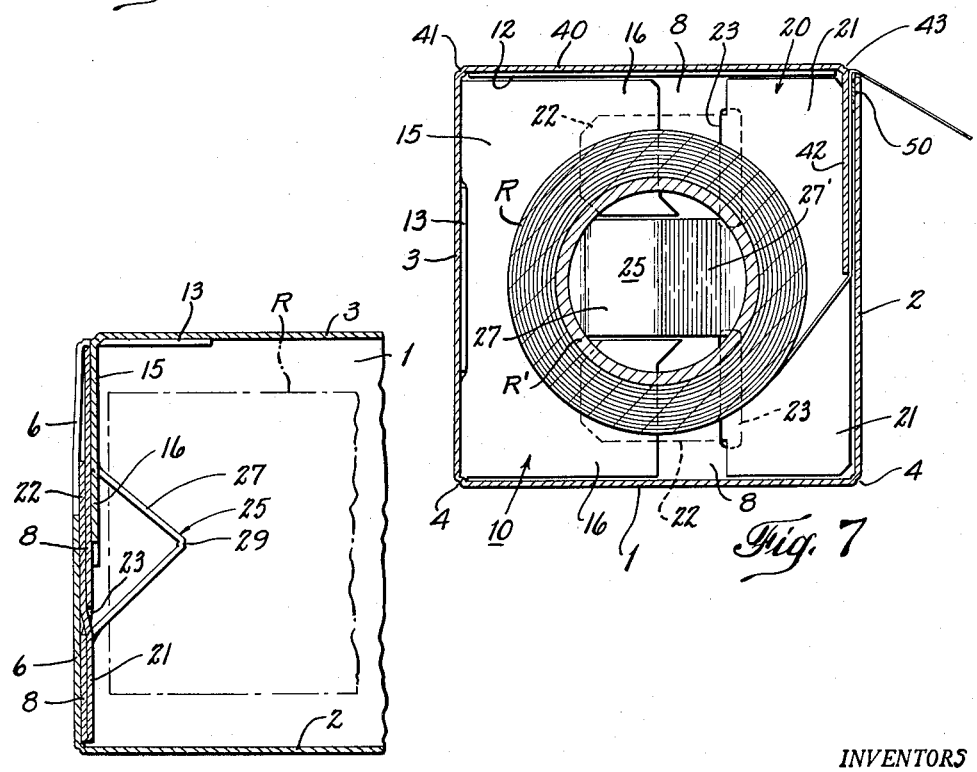
Fig. 6 is another fragmentary horizontal cross section taken along line 6—6 of Fig. 3 showing further details of the article locking means associated with the end wall of the carton.

When the article has been inserted and the box part fully assembled as above described, the dust flaps 12 may be turned inwardly as shown in Fig. 5 and the cover top wall panel 40 swung into closed position. As fully assembled, it will be noted by referring to Figs. 4 and 6 that the free edges 21' of the finger grip extensions 21 will substantially abut the inside face of the front wall panel 2 and the shoulder portions 24 thereof will abut the end edges of the slots 23 so as to maintain the buckling sections 25 in roll engaging position and thus positively prevent removal of the article even though the box part is inverted. Removal of the article can then only be effected by releasing the front end wall flaps 6 and folding the front wall panel downwardly as shown in Fig. 2, to permit outward sliding movement of the finger grip extensions 21 to thereby flatten the buckling sections 25 and thus retract the same from the ends of the article.

Article retaining cartons formed from blanks as indicated in Fig. 1 are economical in the use of paperboard, can be easily and expeditiously hand assembled and packaged with the article therein inserted and suspended in rolling position on the buckling sections 25.

In the blank shown in Fig. 8, the front end wall flaps 6 form the intermediate ply of the three-ply end walls 5, the rear end wall sections 10 form the outer ply of the end walls, and the bottom end wall flaps 8 form the inner ply of the end walls when arranged in overlapped relationship. Each front end wall flap 6 and rear end wall flap 10 of the blank shown in Fig. 8 is dimensioned to substantially correspond to the area of the end wall. Each of the rear end wall flaps 10 may be provided with a dust flap 12 foldably connected thereto along the folding score 12'.

In the blank shown in Fig. 8 the bottom end wall flaps 8 are specially formed to provide the article suspending flaps for this carton. As shown in Fig. 8, each bottom end wall flap 8 comprises a fixed base section 15 foldably connected to the bottom wall panel along the transverse score 9, and a head section 20 hingedly connected to the fixed base section 15 by the buckling section 25. Each buckling section 25 is defined by a pair of longitudinally extending parallel cuts 26 hingedly connected to the fixed base section 15 by a transverse score 28 and hingedly connected at the other end thereto to the head section 20 along the transverse score 28'. A transverse medial score 29 divides each of the buckling sections 25 into a pair of hingedly connected strut portions 27 and 27'.

The parallel extending cuts 26 of the blank shown in Fig. 8 define the vertical side edges of the buckling section 25 when the carton is erected. The cuts 26 also define the spaced leg extensions 16 associated with the fixed base section 15 and the spaced tongue portions 22 extending from the finger grip extension 21 of the head section 20. The ends of the tongue portions 22 are separated from the ends of the leg extensions 16 by the spaced transverse cuts 17. Each pair of tongue portions 22 is designed to be inserted into the spaced slots 23 formed in the adjacent front end wall flaps 6.

The blank shown in Fig. 8 may be machine assembled into carton form on a well known type of box assembly machine. In the assembly operation, a ring $a$ of adhesive is applied to the inside face of the rear end wall flaps 10 around the marginal edges thereof. The article suspending flaps 8 are then erected to extend upwardly, the front and rear wall panels 2 and 3 are then erected, the front end wall flaps 6 are folded to overlie the outside face of the erected bottom end flaps 8. The rear end wall flaps 10 are then folded forwardly and pressed into adhesive engagement with the outside face of the adjacent front end wall flaps 6 to thereby provide a box structure formed as indicated in Fig. 11. Upon completion of the machine assembly operation, the bottom end flaps 8 will extend upwardly to overlie the inside face of the front end wall flaps 6, with the head sections 20 thereof projecting partly above the top edges of the front end wall flaps indicated at the right hand side of Fig. 11.

In packaging the article within the thus formed carton, the tip ends of the tongue portions 22 of each article suspending flap 8 are then threaded into the spaced receiving slots 23 in the intermediate end wall flap 6. Each article suspending flap 8 will then present the buckling section 25 thereof substantially in the plane of the base section 15 and the head section 20 thereof, with the finger grip extension 21 extending above the top horizontal edge of the adjacent end wall forming flaps 6 and 10 as shown at the right hand side of Fig. 11. The article such as a sheet roll R may then be readily dropped into the box part. Downward pressure is then exerted against the free edges 21' of the finger grip extensions 21, causing the head sections 20 to move downwardly to further telescope the tongue portions 22 into the spaced slots 23. When the head sections 20 have been forced downwardly to the point where the top edges 21' thereof are substantially flush with the adjacent top edges of the end wall forming flaps 6 and 10 as shown at the left hand side of Fig. 11, the buckling sections 25 will be automatically buckled inwardly, and the strut portions 27 and 27' thereof will engage the ends of the article, as the roll core R', to lift the article out of contact with the bottom wall panel 1. When the paired strut portions 27 and 27' have thus been projected into the adjacent ends of the article, journaling means are thereby provided which rotatably support the article in raised and spaced relation to the bottom wall panel 1.

When the article has been inserted and journaled in the manner above described, the dust flaps 12 may be turned inwardly to overlie the free top edges 21' of the downwardly telescoped head sections 20 of the article suspending flaps so as to prevent withdrawal of the buckling sections 25 then extending into the ends of the packaged article. The article can thereafter only be intentionally removed from its locked position within the box part by first manually swinging the dust flaps 12 outwardly, and then manually raising the head sections 20 of the article locking flaps 8 so as to flatten the buckling sections 25 thereof into the plane of the base sections 15 thereof. Blanks formed as shown in Fig. 8 are designed for high speed machine assembly, can be economically formed with a minimum waste of paperboard material and the article rapidly packaged in locked position therein.

In the blank shown in Fig. 15, the front end wall flaps 6 form the outer ply of the three ply end walls 5, the bottom end wall flaps 8 form the inner ply of the end walls, and the rear end wall flaps 10 form the intermediate ply of the end walls when arranged in overlapped relationship. Each front end wall flap 6 and bottom end wall flap 8 of this blank is dimensioned to substantially correspond to the area of the end wall. The rear end wall flaps 10 provide the article suspending flaps for the carton formed from the blank shown in Fig. 15.

As shown in Fig. 15, each of the rear end wall flaps 10 present a fixed base section 15 and a head section 20 hingedly connected to the fixed base section 15 by a buckling section 25, and with a side edge of the base section 15 hingedly connected to the adjacent rear wall panel 3 along the transverse score 11. Each buckling section 25 is defined by a pair of transversely extending parallel cut lines 26, and is hingedly connected at one end thereof to the fixed base section 15 by a longitudinal score 28 and is hingedly connected at the other end thereof to the head section 20 along the longitudinal score 28'. A longitudinal medial score 29 divides each of the buckling sections 25 into a pair of connecting strut portions 27 and 27'.

The parallel extending cuts 26 in each flap 10 define the vertical side edges of the buckling section 25 when the carton is erected. The cuts 26 also define the spaced leg extensions 16 associated with the fixed base section 15. It will be noted that in this blank the paired leg extensions 16 extend up to the top of the rear wall panel 2, with the horizontal top edges 16' thereof substantially in the plane of the top edge of the rear wall panel 3 of the box part when erected. The cuts 26 also separate the head section 20 from the leg extensions 16 of the base section 15. The head section 20 thus presents a stem portion 30 of substantially the same width as the buckling section 25 connected thereto. A dust flap 12 may be foldably connected to the upper end of each stem portion 30 along a longitudinal score 31. As thus arranged, the dust flap 12 also serves as a finger grip extension by means of which the head section 20 and its associated buckling section 25 may be manipulated. A pair of brace tabs 33 may be foldably connected to each dust flap 12 along the score extensions 31' and positioned on each side of the stem portion 30 to brace the inturned dust flap.

Each of the bottom end wall flaps 8 have a rectangular hole 32 formed therein into which the buckling section 25 of the intermediate article suspending flap 10 may be projected to engage and support the end of the article. Each rectangular hole 32 is formed to provide wing portions 34 swingably hinged along parallel scores 34' which define opposite edges of the rectangular hole. The wing portions 34 are designed to swing inwardly of the carton when the buckling section 25 is projected through the rectangular hole and to overlie the strut portions 27 and 27' thereof and thus strengthen and reinforce the article supporting means of this carton.

The blank in Fig. 15 is particularly adapted for machine assembly into a fully erected carton ready to receive the article. In the assembly operation, an area $b$ of adhesive is applied to the inside face of each base section 15 and the leg extensions 16 associated therewith, an area $c$ of adhesive is applied to the inside face of each of the front end wall flaps 6 which will cover only the base section 15 and the associated leg extensions 16 of the erected article suspending flap 10. The bottom end wall flaps 8 and the front and rear wall panels 2 and 3 are then erected. Each rear end wall flap 10 is then swung forwardly and pressed into adhesive engagement with the outside face of the adjacent erected bottom end wall flap 8. As shown in Fig. 16, the buckling section 25 of each roll suspending flap 10 will then be positioned to overlie the rectangular hole 32 formed in the adjacent bottom end wall flap 8 so that the buckling section 25 may be projected inwardly therethrough. Each front end wall flap 6 is then swung rearwardly and pressed into adhesive engagement with the base section 15 and associated leg portions 16 of the adjacent erected article suspending flap 10, providing a three ply end wall 5 for this carton.

As thus fully formed and erected, the box part of this carton will present the buckling sections 25 substantially flush with the inner lining flaps 8 so as to permit the article to be freely dropped into the carton to rest on the bottom wall panel 1 as shown in Fig. 16. Thereupon, downward pressure is exerted on the dust flaps 12 associated with the head sections 20 of the suspending flaps 10 so as to cause the stem portions 30 thereof to slide downwardly between the spaced leg portions 16 thereof. Downward sliding movement of the stem portion 30 will cause the associated buckling section 25 to buckle inwardly through the rectangular hole 32 in the inner liner flap 8 with the wing portions 34 overlying the strut portions 27 and 27' thereof. One of the wing portions 34 will be manipulated by strut portion 27' to engage the end of the article, lift the article upwardly in spaced relation to the bottom wall panel 1, and finally project the paired wing portions 34 and paired strut portions 27 and 27' into the adjacent end of the article on roll core R' to provide a suspension support upon which the article may be rotated in suspended position.

When the article has been thus suspended, the dust flaps 12 may be folded inwardly and braced by the brace tabs 33 bearing against the inside face of the end wall as shown in Fig. 17. When the cover top panel 40 is folded to closed position, the dust flaps 12 associated with the roll suspending flaps 10 will abut the inside face of the cover top panel 40 and positively retain the buckling sections 25 in inwardly projecting article engaging position. Blanks formed as shown in Fig. 15 are economical in the use of paperboard, are designed for high speed machine assembly and erection, and the articles may be inserted and suspended in position within the box part thereof by a simple manipulation of the dust flaps 12 associated with the head sections 20 of the article suspending flaps 10.

In the blanks shown in Figs. 21 and 27, the front end wall flaps 6 form the inner ply of the three ply end walls 5, the bottom end wall flaps 8 form the intermediate ply of the end walls, and the rear end wall flaps 10 form the outer ply of the end walls when arranged in overlapped relationship. Each front end wall flap 6 and rear end wall flap 10 of the blanks shown in Figs. 21 and 27 is dimensioned to substantially correspond to the area of the end wall of the assembled carton. The bottom end wall flaps 8 provide the article suspending flaps for the cartons formed from the blanks shown in Figs. 21 and 27.

As shown in Figs. 21 and 27, each of the bottom end wall flaps 8 presents a fixed base section 15 connected to the adjacent end of the bottom panel 1 along the transverse score 9, and a head section 20 hingedly connected to the fixed base section 15 by a buckling section 25. Each buckling section 25, defined by a pair of longitudinally extending parallel cut lines 26, is hingedly connected at one end thereof to the fixed base section 15 by a transverse score 28 and is hingedly connected at the other end thereof to the head section 20 along the transverse score 28'. A transverse medial score 29 divides each of the buckling sections 25 into a pair of strut portions 27 and 27'.

The parallel extending cuts 26 in each of the flaps 8 of the blanks shown in Figs. 21 and 27 define the vertical edges of the buckling section 25 when the cartons formed from these blanks are assembled. The cuts 26 also define the spaced leg extensions 16 associated with the fixed base section 15. In the blanks shown in Figs. 21 and 27, each pair of leg extensions 16 when erected presents their horizontal top edges 16' substantially in the plane of the top edge of the rear wall panel 3 as erected. The cuts 26 also separate the head section 20 from the spaced leg extensions 16, so that the head section 20 presents a stem portion 30 of substantially the same width as the buckling section 25 connected thereto. In the blank shown in Fig. 21, a dust flap 12 may be foldably connected along the horizontal score 12' to the upper end of the rear end wall flap 10. Each of the front end wall flaps 6 of the blanks shown in Figs. 21 and 27 has a rectangular hole 32 presenting inwardly swinging wing portions 34 into which the adjacent buckling section 25 of the intermediate article suspending flap 8 may be projected to provide suspension support for the article or roll core R'.

The blanks shown in Figs. 21 and 27 are both adapted for high speed assembly on standard box assembly machines. To form the box parts of these blanks, an area $e$ of adhesive is applied to the inside face of each of the bottom end wall flaps 8 as defined by the base section 15 and the leg extensions 16 thereof and an area $f$ of adhesive is applied to the inside face of each of the rear end wall flaps 10 which will cover only the base section 15 and the associated leg extensions 16 of the adjacent erected roll suspending flap 8, as indicated in Figs. 21 and 27. The front and rear panels 2 and 3 are then erected and the front wall flaps swing rearwardly. Thereupon, the bottom end wall flaps 8 are erected and the base sections 15 and the leg extensions 16 thereof are pressed into adhesive securement to the outside face of the adjacent erected front end wall flap 6. The buckling section 25 of each article suspending flap 8 will then be in position to overlie the rectangular hole 32 formed in the adjacent erected front end wall flap 6 so that the buckling section 25 may be projected inwardly therethrough. The rear end wall flaps 10 are then swung into adhesive securement against the outside face of the adjacent article suspending flaps 8.

When the box parts of the blanks of Figs. 21 and 27 have thus been erected, the stem portions 30 of the head sections 20 thereof will project partly above the top edges 16' of the leg extensions 16 of the article suspending flaps 8, and the adjacent horizontal edge of the erected inner liner flaps 6 as indicated in Figs. 22 and 28. The buckling section 25 will also be substantially flat so as to permit the sheet roll to be freely dropped into the box part as indicated in Figs. 23 and 29. Downward pressure is then exerted on the projecting edges 30' of the head sections 20 so as to cause the stem portions 30 thereof to slide downward between the spaced leg extensions 16 of the intermediate end wall flaps 10. Downward sliding movement of the stem portion 30 will cause the associated buckling section 25 to buckle inwardly through the rectangular hole 32 in the inner liner flap 6 so that the wing portions 34 will overlie the strut portions 27 and 27' thereof. One of the wing portions 34 will be manipulated by the strut portion 27' to engage the end of the article, lift the article upwardly in spaced relation to the bottom wall panel 1, and finally project the wing portions 34 and paired strut portions 27 and 27' into the adjacent end of the article or roll core R' to provide a suspension support upon which the article may be freely rotated in suspended position.

When the sheet roll has been thus suspended as indicated in the carton shown in Figs. 24 and 26 formed from the blank of Fig. 21 the dust flaps 12 may be folded inwardly to overlie the depressed top edges 30' of the head sections 20. When the cover top panel 40 is then folded to closed position, the dust flaps 12 will abut the inside face of the closed top panel 40 and positively retain the buckling sections 25 in projected position within the ends of the article.

In cartons assembled from blanks formed as indicated in Fig. 27, each of the outer end wall flaps 10 may be provided with an outturned abutment flap 49 hinged along the top edge thereof along the score 49'. The abutment tab 47 secured to the inside face of each end flange section 45 of the cover part is so shaped as to present an abutment edge 51 designed to releasably interlock with the abutment edge 51' of the downturned hinged abutment flap 49 to releasably lock the cover part in closed position. The inside face of the cover top panel 40 as thus closed will substantially abut the upper edge 30' of the head sections 20 of the intermediate article suspending flaps 8 so as to thereby retain the buckling sections 25 thereof fully projected into the ends of the article or roll core R' to support the article in suspended position thereon. As thus mounted, the article can only be removed from the box part by first opening the cover part and then grasping the end edges 30' of the head sections 20 so as to lift the head sections 20 upwardly and thereby retract the associated buckling sections 25 thereof from the ends of the article.

The blank shown in Fig. 31 is advantageously adapted for packaging and assembling at high speed in a single pass through a combination packaging and end sealing machine. In this blank, end wall forming flaps 52 extend from the ends of the cover top panel 40 and are severable therefrom by lines of weakness 53 extending transversely on the blank. Each cover end flap 52 is provided with a rectangular hole 32 having inwardly swinging wing portions 34. Each of the bottom end flaps 8 is also provided with a rectangular hole 32' which has no wing portions but which aligns with the rectangular hole 32 in the adjacent cover end flap 52 when the carton is assembled. Each of the bottom end flaps 8 also has a dust flap 12 hinged thereto along a transverse score 12' which is substantially parallel to the transverse score 9 which defines the end of the bottom panel 1.

Each front end wall flap 6 has the article suspending means associated therewith and presents a fixed base section 15 hinged to the end of the box front panel 2, and a head section 20 hingedly connected to the fixed base section 15 by the buckling section 25. Each buckling section 25 is defined by a pair of longitudinally extending cuts 26 and is hingedly connected at one end thereof to the fixed base section 15 by a transverse score 28 and is hingedly connected at the other end thereof to the head section 20 along a transverse score 28'. A transverse medial score 29 divides each of the buckling sections 25 into a pair of connected strut portions 27 and 27'.

The longitudinal extending cuts 26 in each front end wall flap 6 define spaced leg extensions 16 associated with the fixed base section 15. The cuts 26 are so formed as to provide the inner edges of the leg extensions 16 with inwardly extending abutment shoulders 36. The head section 20 is provided with laterally extending lock wings 35 presenting abutment edges 35' designed to seat against the leg shoulders 36 when the buckling section 25 has been adjusted to article engaging position.

In assembling and packaging a carton formed from the blank as shown in Fig. 31, the body portion of the blank comprising the wall panels 2, 1, 3 and 40 are assembled into tubular form by attaching the cover flap 42 to the outside face of the front panel 2 as by breakable spots of adhesive g as shown in Figs. 31 and 32. The article to be packaged, such as a sheet roll R, is inserted endwise into the tubular body with the end wall forming flaps 6, 8, 10 and 52 flared outwardly. By an end sealing operation, each of the bottom end wall flaps 8 is folded inwardly to overlie the end of the article contained in the tubular body and its dust flap 12 tucked into the tubular body so as to underlie the inside face of the cover top panel 40 as shown in Fig. 33. Two spaced strips h of adhesive are applied to the inside face of each cover end flap 52 as indicated in Fig. 33 and two spaced strips i of adhesive are applied to the outside face of the end flap 52, care being taken to apply no adhesive to the wing portions 34 thereof. Each cover end flap 52 is then folded into adhesive securement with the underlying bottom end flap 8 as shown in Fig. 34, whereupon the rectangular hole 32 in the cover end flap 52 will substantially register with the rectangular hole 32' in the underlying bottom end flap 8.

With the two spaced strips i of adhesive previously applied to the outside face of the folded cover end flap 52 as shown in Fig. 34, each front end flap 6 is thereupon folded to overlie the outside face of the folded cover end flap 52 as shown in Fig. 35. By means of automatically operated instruments associated with the end seal machine, the head section 20 is lifted and the buckling section 25 driven inwardly as shown in Fig. 36. This operation drags the abutment edges 35' of the lock wings 35 into abutment against the shoulder portions 36 of the leg extensions 16 associated with the front end wall flap 6 as shown in Fig. 36. As a result of this operation, the wing portions 34 associated with the cover end flaps 52 and the strut portions 27 and 27' associated with the front end wall flaps 6 are projected through the adjacent rectangular hole 32' in the adjacent bottom end flaps 8, with the wing portions 34 overlying the strut portions 27 and 27' as indicated in Figs. 36 and 37.

In the final assembly operation, an area of adhesive j is applied to the entire inside face of each of the rear end flaps 10 and each flap 10 then folded to overlie the front end wall flap 6. In this folding operation, the head section 20 of each front end wall flap 6 will be engaged by the rear end wall flap 10 and folded forwardly along its score 28' to overlie the inwardly pressed buckling section 25, as shown in Fig. 37. Thereupon, each rear end wall flap 10 is pressed into adhesive engagement with the base section 15, leg extensions 16 and the folded over head section 20 of the underlying front end flap 6. The carton will then be fully assembled in condition for storage and shipment to the consumer with the contents sealed and fully protected.

When access to the packaged article is desired, a slight outward pull on the cover front flap 42 will loosen the same from its securement to the box front panel 2. Upward lifting force exerted on the cover top panel 40 will break loose the ends of the cover top panel along the weakened line 53, leaving the cover end flaps 52 as a permanent part of the multi-ply end walls 5 of the box part.

In this carton construction, it will be noted that the end walls 5 of the box part are of substantially four-ply thickness and have substantial strength and rigidity to support the article in suspended position. It will be further noted that the buckling sections 25 may be permanently fixed in inwardly projecting article engaging position since the head sections 20 of the article suspending flap 6 may be adhesively secured to the overlying rear end wall flaps 10, which additionally provide a smooth outer facing for the box end wall. When the cover top panel 40 has been broken open, the dust flaps 12 provide support for the cover top panel 40 and are in position to protect the packaged article from the entry of dust. Thereafter the cover may be reclosed by inserting the cover front flap 43 into the carton to overlie the inside face of the box front panel 2 as shown in Fig. 40.

It will also be noted that in this construction the strut portions 27 and 27' of the buckling sections 25 are reinforced and strengthened by the overlying wing portions 34, and the hinging scores 29 of the buckling sections extending vertically to provide maximum support for the article suspending therefrom. Additionally, the grain fibers of the blank will extend longitudinally of the wing portions 34 so that the wing portions 34 will also possess maximum stiffness. The blank shown in Fig. 31 need be finished and printed on one side thereof only, and can be cut and formed as a substantially rectangular blank with almost no waste resulting from the cutting. This blank is so shaped and formed as to permit execution of the article inserting operation and carton assembly operation in a single pass through a high speed packaging and end sealing machine.

In the various forms of this invention as above described, it will be appreciated that the paired buckling sections 25 are so cut and formed that when buckled inwardly into article suspending position, they will be positioned approximately medially between the top and bottom edges of the box end walls 5. The box parts of these cartons may also be so formed as to present the medial scores 29 of the buckling sections 25 either in substantially vertically extending position as indicated in Figs. 2 to 7 and Figs. 31 to 40, or in substantially horizontally extending position as indicated in Figs. 11 to 14, Figs. 16 to 20, Figs. 22 to 26 and in Figs. 27 to 30.

In forming the carton blanks, it is desirable to so cut the blanks that the grain fibers will extend generally parallel to the bottom wall defining scores 4 to provide a box structure of maximum strength. It is also desirable to so form the buckling sections 25 of the article suspending flaps that the grain fibers will extend substantially at right angles to the end hinging scores 28 and 28' and the medial hinging score 29 thereof. When so formed, these hinging scores will have desirable resilient characteristics, and will have maximum strength and resistance to tearing along these score lines. Additionally, when the buckling sections 25 are thus cut, the grain fibers will extend lengthwise of the buckling sections 25 so that the strut forming portions 27 and 27' thereof will have maximum stiffness and strength.

It will also be appreciated from the above description that the article suspending flaps may extend from the ends of the front wall panels 2, or the bottom wall panel 1, or the rear wall panel 3 of the box part as selectively desired. It will also be appreciated that cartons formed from the blank shown in Figs. 1, 8, 15 and 21 may be provided with telescoping cover parts formed as indicated in Figs. 27 to 31, and with or without a hinged abutment flap 49 associated with the end walls 5 thereof. The improved article suspending and journaling means of this invention may also be associated with the end walls of various different types and forms of paperboard and fiberboard cartons and containers to best accommodate the articles to be packaged therein.

While certain novel features of this invention have been disclosed above, and are pointed out in the claims, it will be understood that various omissions, substitutions and changes may be made by those skilled in the art without departing from the spirit of this invention.

What is claimed is:

1. An improved article containing and suspending carton which includes, a box part presenting bottom, side and end walls designed to contain the article therein, and article suspending means associated with each of the end walls of the box part, said means including an article suspending flap associated with each of the opposite end walls of the box part, each of said flaps presenting a base section fixed to one of said box walls, a head section extensible beyond an edge of the end wall with which it is associated, means for guiding the movement of said head section including spaced tongue portions projecting from said head section and extensible into spaced slots provided in the adjacent end wall, and a collapsible buckling section foldably connected to said base and head sections, said head section being operative when manipulated into extensible position in one direction to thereby flatten said buckling section so as to permit convenient insertion of the article into the box part, said head section being further operative when manipulated in an opposite direction to project said buckling section inwardly and into article suspending engagement with the article contained in the box part.

2. An improved carton designed to contain and rotatably suspend a sheet roll having an axial hole at each end of the sheet roll, said carton including a box part presenting bottom, side and end walls designed to contain the sheet roll therein, and article suspending and journaling means associated with each of the end walls of the box part, said means including a roll suspending flap associated with each of the opposite end walls of the box part, each of said flaps presenting a base section fixed to one of said box walls, a head section extensible beyond an edge of the end wall with which it is associated, means for guiding the movement of said head section including spaced tongue portions projecting from said head section and extensible into spaced slots provided in the adjacent end wall, and a collapsible buckling section foldably connected to said base and head sections, said head section being operative when manipulated into extensible position in one direction to thereby flatten said buckling section so as to permit convenient insertion of the sheet roll into the box part, said head section being further operative when manipulated in an opposite direction to project said buckling sections inwardly into the axial hole in the adjacent end of the roll to thereby suspend the roll in the box part.

3. An article containing and article locking carton which includes, a box part presenting a bottom panel, a front panel, a rear panel and multi-ply end walls, each of said multi-ply end walls being formed by overlapping end wall forming flaps extending from the adjacent ends of said bottom, front and rear panels, one of said flaps associated with each of said end walls having means for engaging the adjacent end of the article packaged in the box part, each of said article engaging flaps comprising a base section connected to the adjacent end of one of said panels, a head section having spaced tongue portions extending therefrom designed to slidably project through spaced slots formed in the adjacent end wall forming flap, and a buckling section hingedly connected to said base and head sections operative to be projected inwardly of the box part and into engagement with the article packaged therein upon manipulation of said head section, said head section being extensible beyond the adjacent edge of the adjacent end wall forming flaps to thereby flatten said buckling section and permit insertion of the article into the box part, said head section being further operative when manipulated in an opposite direction to project said buckling sections inwardly into locking engagement with the article contained in the box part.

4. An improved carton formed from a single blank of paperboard material designed to contain and rotatably suspend a sheet roll having an axial hole at each end of the sheet roll, said carton including a box part presenting a bottom panel, a front panel, a rear panel and multi-ply end walls, each of said multi-ply end walls being formed by overlapping end wall forming flaps extending from the adjacent ends of said bottom, front and rear panels, each of said flaps connected to the bottom panel having means for rotatably suspending the adjacent end of the sheet roll, each of said roll suspending flaps comprising a base section connected to the adjacent end of said bottom panel, a head section having spaced tongue portions extending therefrom designed to slidably project through spaced slots formed in the adjacent end wall forming flap, and a buckling section hingedly connected to said base and head sections operative to be projected into the axial hole in the adjacent end of the roll upon manipulation of said head section.

5. An improved carton formed from a single blank of paperboard material designed to contain and rotatably suspend a sheet roll having an axial hole at each end of the sheet roll, said carton including a box part presenting a bottom panel, a front panel, a rear panel and multi-ply end walls, each of said multi-ply end walls being formed by overlapping end wall forming flaps extending from the adjacent ends of said bottom, front and rear panels whereby said overlapped flaps provide an inner liner flap, an outer facing flap and an intermediate flap, said inner flap having a base section connected to the adjacent end of one of said panels, a head section presenting a pair of spaced downwardly extending tongue portions designed to slidably project through spaced slots formed in the adjacent intermediate end wall flap, and a buckling section hingedly connected to said base and head sections and operative to be projected into the axial hole in the adjacent end of the roll upon manipulation of said head section.

6. An improved carton formed from a single blank of paperboard material designed to contain and suspend an article therein, said carton including a box part presenting a bottom panel, a front panel, a rear panel and multi-ply end walls, each of said multi-ply end walls being formed by overlapping end wall forming flaps extending from the adjacent ends of said bottom, front and rear panels whereby said overlapped flaps provide an inner liner flap, an outer facing flap and an intermediate flap, said intermediate flap having a base section connected to the adjacent end of one of said panels and presenting a pair of spaced leg portions, a head section, and a buckling section positioned between said spaced leg portions and hingedly connected to said base and head sections, said head section being extensible beyond the adjacent end edge of the end wall with which it is associated and operative when manipulated into extended position in one direction to thereby flatten said buckling section so as to permit convenient insertion of the article into the box part, said head section being further operative when manipulated in an opposite direction to project said buckling section inwardly of the carton, each of said inner liner flaps having inwardly swinging wing portions formed therein, said wing portions defining a hole in said inner liner flap through which the adjacent buckling section projects whereby said wing portions and buckling section together provide a suspension support for the article.

7. An improved carton formed from a single blank of paperboard material designed to contain and suspend an article therein, said carton including a bottom panel, a front panel, a rear panel, a top panel and multi-ply end walls, each of said multi-ply end walls being formed by overlapping end wall forming flaps extending from the adjacent ends of said bottom, front, rear and top panels whereby said overlapped flaps provide an inner liner flap, an outer facing flap and two intermediate flaps, one of said intermediate flaps having a base section connected to the adjacent end of said front panel, a head section, and a buckling section hingedly connected to said base and head sections, the other of said intermediate flaps extending from the adjacent end of said top panel and having a hole therein, said inner liner flap extending from the adjacent end of said bottom panel having a hole therein substantially in registry with the hole in said other intermediate flap, said outer facing flap extending from the adjacent end of said rear panel and providing a finished outer facing for the multi-ply end wall, said buckling section projecting through the aligned holes in said inner liner flap and the adjacent intermediate flap whereby said buckling section provides a suspension support for the article.

8. An improved carton formed from a single blank of paperboard material designed to contain and suspend an article therein, said carton including a bottom panel, a front panel, a rear panel, a top panel and multi-ply end walls, each of said multi-ply end walls being formed by overlapping end wall forming flaps extending from the adjacent ends of said bottom, front, rear and top panels whereby said overlapped flaps provide an inner liner flap, an outer facing flap and two intermediate flaps, one of said intermediate flaps having a base section connected to the adjacent end of said front panel and presenting a pair of spaced leg portions, a head section, and a buckling section positioned between said spaced leg portions and hingedly connected to said base and head sections, the other of said intermediate flaps extending from the adjacent end of said top panel and having a pair of inwardly swinging wing portions defining a hole therein, said inner liner flap extending from the adjacent end of said bottom panel having a hole therein substantially in registry with the hole in said other intermediate flap, said outer facing flap extending from the adjacent end of said rear panel and providing a finished outer facing for the multi-ply end wall, said buckling section projecting through the aligned holes in said inner liner flap and the adjacent intermediate flap whereby said inwardly swinging wing portions and said buckling section jointly provide a suspension support for the article.

9. A one-piece carton forming blank having means associated therewith for suspending an article in the carton as assembled, said blank comprising box forming front, bottom and rear panels connected in side by side relation along substantially parallel longitudinally extending scores, an end wall forming flap extending from each end of said front, bottom and rear panels and designed to be arranged in overlapping relationship, one of said end wall forming flaps at each end of the blank incorporating means for suspending one end of the article, said article suspending flap presenting a base section foldably connected to the adjacent panel, a head section, and a buckling section having the end portions thereof foldably connected to said base section and head section, said head section having spaced tongue portions extending therefrom on opposite sides of said buckling section, the adjacent end wall forming flap having spaced slots therein through which said tongue portions may project when the carton is assembled, said article suspending flap having an over-all length when fully extended which is substantially greater than the corresponding length of the end wall portions of the adjacent end wall forming flaps.

10. A one-piece carton forming blank having means associated therewith for suspending an article in the carton as assembled, said blank comprising box forming front, bottom and rear panels connected in side by side relation along substantially parallel longitudinally extending scores, an end wall forming flap extending from each end of said front, bottom and rear panels and designed to be arranged in overlapping relationship, one of said end wall forming flaps at each end of the blank incorporating means for suspending one end of the article, said article suspending flap presenting a base section foldably connected to the adjacent panel, a head section, and a buckling section having the end portions thereof foldably connected to the base section and the head section, one of said adjacent end wall forming flaps having a conforming hole therein through which said buckling section may be projected when the carton is assembled, said article suspending flap having an over-all length when fully extended which is substantially greater than the corresponding length of the end wall portions of the adjacent end wall forming flaps.

11. A one-piece carton forming blank having means associated therewith for suspending an article in the carton as assembled, said blank comprising box forming front, bottom and rear panels connected in side by side relation along substantially parallel longitudinally extending scores, an end wall forming flap extending from each end of said front, bottom and rear panels and designed to be arranged in overlapped relationship, one of said end wall forming flaps at each end of the blank incorporating means for suspending one end of the article, said article suspending flap presenting a base section foldably connected to the adjacent panel, a head section, and a buckling section having the end portions thereof foldably connected to said base section and head section, said base section having spaced leg portions extending along opposite sides of said buckling section, one of said adjacent end wall forming flaps having a conforming hole therein through which said buckling section may be projected when the carton is assembled, said article suspending flap having an overall length when fully extended which is substantially greater than the corresponding length of the end wall portions of the adjacent end wall forming flaps.

12. A one-piece carton forming blank having means associated therewith for suspending an article in the carton as assembled, said blank comprising box forming front, bottom and rear panels connected in side by side relation along substantially parallel longitudinally extending scores, an end wall forming flap extending from each end of said front, bottom and rear panels and designed to be arranged in overlapping relationship, one of said end wall forming flaps at each end of the blank incorporating means for suspending one end of the article, said article suspending flap presenting a base section foldably connected to the adjacent panel, a head section, and a buckling section having the end portions thereof foldably connected to said base section and head section, one of said adjacent end wall forming flaps having a pair of swingable wing portions formed thereon defining a conforming hole through which said buckling section may be projected when the carton is assembled, said article suspending flap having an overall length when fully extended which is substantially greater than the corresponding length of the end wall portions of the adjacent end wall forming flaps.

13. A one-piece carton forming blank having means associated therewith for supporting an article in the carton as assembled, said blank comprising box forming front, bottom and rear panels and a cover forming top panel connected in side by side relation along substantially parallel longitudinally extending scores, an end wall forming flap extending from each end of said front, bottom, rear and top panels and designed to be arranged in overlapped relationship, one of said end wall flaps at each end of the blank incorporating means for suspending the article when the carton is assembled, said article suspending flap presenting a base section foldably connected to the adjacent panel, a head section, and a buckling section having the end portions thereof foldably connected to said base section and head section, two of said end flaps at each end of the blank each having a hole therein through which said buckling section may project when the carton is assembled.

14. A one-piece carton forming blank having means associated therewith for supporting an article in the carton as assembled, said blank comprising box forming front, bottom and rear panels and a cover forming top panel connected in side by side relation along substantially parallel longitudinally extending scores, an end wall forming flap extending from each end of said front, bottom, rear and top panels and designed to be arranged in overlapped relationship, said front end wall flap at each end of the blank incorporating means for suspending the article when the carton is assembled, said article suspending flap presenting a base section foldably connected to the front panel, a head section, and a buckling section having the end portions thereof foldably connected to said base section and head section, each of said bottom end flaps having a hole therein through which said buckling section may project when the carton is assembled, each of said top panel end flaps also having a hole therein through which said buckling section may project when the carton is assembled, each of said rear end flaps providing the outer facing for the composite end wall of the carton as assembled.

15. A one-piece carton forming blank having means associated therewith for supporting an article in the carton as assembled, said blank comprising box forming front, bottom and rear panels and a cover forming top panel connected in side by side relation along substantially parallel longitudinally extending scores, an end wall forming flap extending from each end of said front, bottom rear and top panels and designed to be arranged in overlapped relationship, said front end wall flap at each end of the blank incorporating means for suspending the article when the carton is assembled, said article suspending flap presenting a base section foldably connected to the front panel and presenting spaced leg extensions, a head section, and a buckling section positioned between said leg extensions and having the end portions thereof foldably connected to the base section and head section, each of said bottom end flaps having a hole therein through which said buckling section may project when the carton is assembled, each of said top panel end flaps having swingable wing portions formed therein defining a hole through which said buckling section may project when the carton is assembled, and a dust flap foldably connected to each of said bottom panel end flaps along a folding score extending substantially parallel to the end of the bottom panel.

16. A one-piece carton forming blank having means associated therewith for supporting an article in the carton as assembled, said blank comprising box forming front, bottom and rear panels, and a cover forming top panel connected in side by side relation along substantially parallel longitudinal extending scores, an end wall forming flap extending from each end of said front, bottom, rear and top panels and designed to be arranged in overlapped relationship, said front end wall flap at each end of the blank incorporating means for suspending the article when the carton is assembled, said article suspending flap presenting a base section foldably connected to the front panel and presenting spaced leg extensions, a head section, and a buckling section positioned between said leg extensions and having the end portions thereof foldably connected to the base section and head section, each of said bottom end flaps having a hole therein through which said buckling section may project when the carton is assembled, each of said top panel end flaps having swingable wing portions formed therein defining a hole through which said buckling section may project when the carton is assembled, a dust flap foldably connected to each of said bottom panel end flaps along the folding score extending substantially parallel to the end of the bottom panel, each of said rear end flaps providing the outer facing for the composite end wall of the carton as assembled.

17. An article suspending and containing carton formed from a single blank of paperboard material, said carton including a box part designed to contain the article therein and presenting a bottom panel, opposite side panels and opposite plural-ply end walls, and an article suspending flap forming a part of one of said end walls operative to engage and suspend the article in package position within the box part, said article suspending flap presenting a base section integrally connected to one of said box panels, a head section extensible beyond an edge of the end wall with which it is associated, and a pair of buckling sections foldably connected to said base section and head section and formable into a V-shaped projection, said head section being operative when manipulated into extensible position in one direction to thereby flatten said buckling sections so as to permit convenient insertion of the article into the box part, said head section being further operative when manipulated in an opposite direction to project said buckling sections inwardly and into article suspending engagement with the article contained in the box part.

18. An article suspending and containing carton formed from a single blank of paperboard material, said carton including a box part designed to contain the article therein and presenting a bottom panel opposite side panels and opposite plural-ply end walls, and a pair of article suspending flaps forming a part of the opposite end walls operative to engage opposite portions of the article and suspend the article in package position within the box part, each of said article suspending flaps presenting a base section integrally connected to one of said box panels, a head section extensible beyond an edge of the end wall with which it is associated, and a pair of buckling sections foldably connected to said base section and head section and formable into a V-shaped projection, said head sections being operative when manipulated into extensible position in one direction to thereby flatten said buckling sections so as to permit convenient insertion of the article into the box part, said head sections being further operative when manipulated in an opposite direction to project said buckling sections inwardly and into article suspending engagement with the article contained in the box part.

19. An article suspending and containing carton formed from a single blank of paperboard material, said carton including a box part designed to contain the article therein presenting a bottom panel, opposite side panels and opposite plural-ply end walls, an article suspending flap forming a part of each of said end walls operative to engage and suspend the article in package position within the box part, each of said article suspending flaps presenting a base section integrally connected to one of said box panels, a head section extensible beyond an edge of the end wall with which it is associated, and a pair of buckling sections foldably connected to said base section and head section and formable into a V-shaped projection, said head sections being operative when manipulated into extensible position in one direction to thereby flatten said buckling sections so as to permit convenient insertion of the article into the box part, said head sections being further operative when manipulated in an opposite direction to project said buckling sections inwardly and into article suspending engagement with the article contained in the box part, and means forming a part of said multiply end walls for guiding the movement of each of said head sections.

20. An improved carton for containing and rotatably supporting a sheet roll having an axial hole at each end of the roll, said carton including a box part designed to contain the sheet roll and presenting a bottom panel, opposite side panels and opposite plural-ply end walls, and means for supporting the sheet roll in rotatable position within the box part, said supporting means including a roll supporting flap forming a part of each of said end walls, each of said roll supporting flaps presenting a base section integrally connected to one of said box panels, a head section extensible beyond an end edge of the end wall with which it is associated, and a pair of foldably connected buckling sections foldably connected to said base section and head section and formable into a V-shaped projection, said head sections being operative when manipulated into extensible position in one direction to thereby flatten said buckling sections so as to permit convenient insertion of the roll into the box part, said head sections being further operative when manipulated in an opposite direction to project said buckling section inwardly into the axial hole in the adjacent end of the roll and thereby suspend the roll within the box part.

21. An improved carton for containing and rotatably supporting a sheet roll having an axial hole at each end of the roll, said carton including a box part designed to contain the sheet roll and presenting a bottom panel, opposite side panels and opposite plural-ply end walls, roll suspending and journalling means associated with each of the end walls of the box part, each of said roll suspending means including a roll supporting flap presenting a base section integrally connected to one of said box panels, a head section extensible beyond an end edge of the end wall with which it is associated, and a pair of foldably connected buckling sections foldably connected to said base section and head section and formable into a V-shaped projection, said head sections being operative when manipulated into extensible position in one direction to thereby flatten said buckling sections so as to permit convenient insertion of the roll into the box part, said head sections being further operative when manipulated in an opposite direction to project said buckling sections inwardly into the axial hole in the adjacent end of the roll and thereby suspend the roll within the box part, and means associated with an adjacent ply of each of said plural-ply end walls for guiding the movement of each of said head sections.

22. An improved carton formed from a single blank of paperboard material designed to contain and rotatably suspend a sheet roll having an axial hole at each end of the sheet roll, said carton including a box part presenting a bottom panel, a front panel, a rear panel and multi-ply end walls, each of said multi-ply end walls being formed by overlapping end wall forming flaps extending from the adjacent ends of said bottom, front and rear panels, one of said flaps associated with each end wall having means for rotatably suspending the adjacent end of the sheet roll, each of said roll suspending flaps presenting a base section integrally connected to the adjacent end of one of said box panels, a head section extensible beyond an end edge of the end wall with which it is associated, and a pair of foldably connected buckling sections foldably connected to said base section and head section and formable into a V-shaped projection, said head sections being operative when manipulated into extensible position in one direction to thereby flatten said buckling sections so as to permit convenient insertion of the roll into the box part, said head sections being further operative when manipulated in an opposite direction to project said buckling sections inwardly into the axial hole in the adjacent end of the roll and thereby suspend the roll within the box part, and means associated with an adjacent end wall flap of each of said end walls for guiding the movement of each of said head sections.

23. An improved carton formed from a single blank of paperboard material designed to contain and rotatably suspend a sheet roll having an axial hole at each end of the sheet roll, said carton including a box part presenting a bottom panel, a front panel, a rear panel and multi-ply end walls, each of said multi-ply end walls being formed by overlapping end wall forming flaps extending from the adjacent ends of said bottom, front and rear panels whereby said overlapping flaps provide an inner liner flap, an outer facing flap and an intermediate flap, one of said end wall flaps of each end wall having a base section integrally connected to the adjacent end of one of said box panels, a head section extensible beyond an end edge of the end wall with which it is associated, and a pair of foldably connected buckling sections foldably connected to said base section and head section and formable into a V-shaped projection, said head sections being operative when manipulated into extensible position in one direction to thereby flatten said buckling sections so as to permit convenient insertion of the roll into the box part, said head sections being further operative when manipulated in an opposite direction to project said buckling sections inwardly into the axial hole in the adjacent end of the roll and thereby suspend the roll within the box part, and means associated with an adjacent end wall flap of each of said end walls for guiding the movement of each of said head sections.

24. An improved carton formed from a single blank of paperboard material designed to contain and suspend an article therein, said carton including a box part presenting a bottom panel, a front panel, a rear panel and multi-ply end walls, each of said multi-ply end walls being formed by overlapping end wall forming flaps extending from the adjacent ends of said bottom, front and rear panels whereby said overlapped flaps provide an inner liner flap, an outer facing flap and an intermediate flap, said intermediate flap having a base section connected to the adjacent end of one of said panels and presenting a pair of spaced leg portions, a head section, and a pair of foldably connected buckling sections formable into a V-shaped projection extending between said spaced leg portions and hingedly connected to said base and head section, said head section being extensible beyond the adjacent end edge of the end wall with which it is associated and operative when manipulated into extended position in one direction to thereby flatten said buckling sections so as to permit convenient insertion of the article into the box part, said head section being further operative when manipulated in an opposite direction to project said buckling sections inwardly into supporting engagement with the article, said inner liner flap having a hole therein through which the adjacent buckling sections are projected.

25. An improved carton formed from a single blank of paperboard material designed to contain and suspend an article therein, said carton including a box part presenting a bottom panel, a front panel, a rear panel and multi-ply end walls, each of said multi-ply end walls being formed by overlapping end wall forming flaps extending from the adjacent ends of said bottom, front and rear panels whereby said overlapped flaps provide an inner liner flap, an outer facing flap and an intermediate flap, said intermediate flap having a base section connected to the adjacent end of one of said panels and presenting a pair of spaced upwardly extending leg portions, a head section guided by said spaced leg portions, and a pair of foldably connected buckling sections foldably connected to said base section and head section and formable into a V-shaped projection, said head section being extensible beyond the adjacent end edge of the end wall with which it is associated and operative when manipulated into extended position in one direction to thereby flatten said buckling sections so as to permit convenient insertion of the article into the box part, said head sections being further operative when manipulated in an opposite direction to project said buckling sections inwardly of the carton, said inner liner flap having a hole therein through which the adjacent buckling section may be projected to provide suspension support for the article.

26. A one-piece carton forming blank having means associated therewith for suspending an article in the carton as assembled, said blank comprising box forming front, bottom and rear panels connected in side by side relation along substantially parallel longitudinally extending scores, an end wall forming flap extending from each end of said front, bottom and rear panels and designed to be arranged in overlapping relationship, one of said end wall forming flaps at each end of the blank incorporating means for suspending one end of the article, said article suspending flap presenting a base section foldably connected to the adjacent panel, a head section, and a pair of foldably connected buckling sections having the end portions thereof foldably connected to said base section and head section, said paired buckling sections being formable into an inwardly extending V-shaped projection upon manipulation of said head section, said article suspending flap having an over-all length when fully extended which is substantially greater than the corresponding length of the end wall portions of the adjacent end wall forming flaps.

27. A one-piece carton forming blank having means associated therewith for suspending an article in the carton as assembled, said blank comprising box forming front, bottom and rear panels connected in side by side relation along substantially parallel longitudinally extending scores, an end wall forming flap extending from each end of said front, bottom and rear panels and designed to be arranged in overlapping relationship, one of said end wall forming flaps at each end of the blank incorporating means for suspending one end of the article, said article suspending flap presenting a base section foldably connected to the adjacent panel and presenting a pair of spaced leg portions, a head section, and a pair of foldably connected buckling sections positioned between said leg portions and foldably connected to said base section and head section, said paired buckling sections being formable into an inwardly extending V-shaped projection upon manipulation of said head section, said article suspending flap having an over-all length when fully extended which is substantially greater than the corresponding length of the end wall portions of the adjacent end wall forming flaps.

References Cited in the file of this patent
UNITED STATES PATENTS

| | | |
|---|---|---|
| 521,050 | Schroder | June 5, 1894 |
| 1,176,786 | Stranders | Mar. 28, 1916 |
| 2,101,355 | Wonder | Dec. 7, 1937 |
| 2,240,811 | Snelling | May 6, 1941 |
| 2,309,396 | Jackson | Jan. 26, 1943 |
| 2,330,117 | Feinberg | Sept. 21, 1943 |
| 2,414,333 | Schieman | Jan. 14, 1947 |
| 2,458,844 | Foote | Jan. 11, 1949 |
| 2,624,521 | Broeren | Jan. 6, 1953 |
| 2,631,724 | Wright | Mar. 17, 1953 |